(12) United States Patent
Hong et al.

(10) Patent No.: US 12,148,981 B2
(45) Date of Patent: Nov. 19, 2024

(54) ELECTRONIC DEVICE FOR COMPENSATING FOR LOSS OF INTER FREQUENCY SIGNAL BETWEEN ANTENNA MODULE AND INTER FREQUENCY INTEGRATED CIRCUIT

(71) Applicant: SAMSUNG ELECTRONICS CO., LTD., Suwon-si (KR)

(72) Inventors: Sukchan Hong, Suwon-si (KR); Minhong Do, Suwon-si (KR); Seongjin Park, Suwon-si (KR); Kyungrok Lee, Suwon-si (KR); Seokwoo Lee, Suwon-si (KR); Jaebong Chun, Suwon-si (KR); Hyunsuk Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 358 days.

(21) Appl. No.: 17/493,326

(22) Filed: Oct. 4, 2021

(65) Prior Publication Data

US 2022/0029272 A1    Jan. 27, 2022

Related U.S. Application Data

(63) Continuation of application No. PCT/KR2020/000412, filed on Jan. 9, 2020.

(30) Foreign Application Priority Data

Apr. 5, 2019 (KR) .................. 10-2019-0039879

(51) Int. Cl.
*H01Q 21/00* (2006.01)
*H01Q 1/22* (2006.01)
*H01Q 9/04* (2006.01)

(52) U.S. Cl.
CPC ......... *H01Q 1/2283* (2013.01); *H01Q 9/0457* (2013.01); *H01Q 21/0075* (2013.01)

(58) Field of Classification Search
CPC .. H01Q 1/2283; H01Q 1/243; H01Q 21/0075; H01Q 21/28; H01Q 3/34;
(Continued)

(56) References Cited

U.S. PATENT DOCUMENTS 7,463,865 B2    12/2008  Reese et al.
7,618,846 B1 *  11/2009  Pagaila .................. H01L 24/19
                                                   257/E21.599
(Continued)

FOREIGN PATENT DOCUMENTS

EP      3 010 083       4/2016
KR  10-2010-0058167     6/2010
(Continued)

OTHER PUBLICATIONS

International Search Report for PCT/KR2020/000412, mailed Apr. 24, 2020, 5 pages.
(Continued)

*Primary Examiner* — Thien M Le
(74) *Attorney, Agent, or Firm* — Nixon & Vanderhye, P.C.

(57) ABSTRACT

Disclosed is an electronic device including a plurality of radio frequency integrated circuits (RFICs) that delivers a digital signal, which is to be transmitted by a modem through an antenna configured to transmit and/or receive a radio frequency (RF) signal, in a form of the RF signal and to deliver the RF signal received from the antenna, in a direction of the modem, wherein the plurality of RFICs are at least partially connected to one another, an inter frequency integrated circuit (IFIC) connected to at least some RFICs among the plurality of RFICs and configured to receive the
(Continued)

digital signal from the modem, to convert the digital signal to an inter frequency (IF) signal, to deliver the IF signal to the RFIC, to convert the RF signal delivered from the RFIC to the IF signal, and to deliver the IF signal to the modem, and a plurality of compensation units respectively connected to the plurality of RFICs or respectively positioned inside of the plurality of RFICs, the compensation units comprising circuitry configured to compensate for a loss of the IF signal occurring between the IFIC and the at least some RFICs or to compensate for a loss of the IF signal occurring between the plurality of RFICs.

15 Claims, 20 Drawing Sheets

(58) Field of Classification Search
CPC .......... H01Q 9/0457; H04B 1/00; H04B 1/12; H04B 1/40; H04B 1/401; H04M 1/02
See application file for complete search history.

(56) References Cited

U.S. PATENT DOCUMENTS

| | | | |
|---|---|---|---|
| 8,045,925 | B2 | 10/2011 | Wong |
| 8,913,702 | B2 | 12/2014 | Wei et al. |
| 9,350,392 | B2 | 5/2016 | Lin et al. |
| 9,843,375 | B2 | 12/2017 | Kim et al. |
| 2001/0011935 | A1* | 8/2001 | Lee .................. H03H 9/02574 |
| | | | 29/25.35 |
| 2004/0166823 | A1 | 8/2004 | Alderton |
| 2005/0047492 | A1* | 3/2005 | Amerga ............. H04B 1/70735 |
| | | | 375/150 |
| 2005/0054368 | A1* | 3/2005 | Amerga ............ H04W 36/0085 |
| | | | 455/525 |
| 2007/0072555 | A1 | 3/2007 | Reese et al. |
| 2009/0298434 | A1 | 12/2009 | Wong |
| 2013/0202071 | A1 | 8/2013 | Wei et al. |
| 2014/0051373 | A1* | 2/2014 | Klomsdorf ........... H04B 1/0475 |
| | | | 455/114.3 |
| 2014/0162570 | A1 | 6/2014 | Lin et al. |
| 2014/0349592 | A1* | 11/2014 | Okazaki ................... H04B 1/50 |
| | | | 455/75 |
| 2017/0063583 | A1* | 3/2017 | Reinhardt ........... H04L 27/0002 |
| 2019/0165473 | A1* | 5/2019 | Yun ...................... H01Q 21/062 |
| 2022/0013891 | A1* | 1/2022 | Yang ....................... H01L 31/12 |
| 2022/0225244 | A1* | 7/2022 | Lee ...................... H04B 7/0404 |
| 2023/0388886 | A1* | 11/2023 | Huang .................. H04W 36/14 |

FOREIGN PATENT DOCUMENTS

| | | |
|---|---|---|
| KR | 10-2013-0081277 | 7/2013 |
| KR | 10-1361705 | 2/2014 |
| KR | 10-2016-0145449 | 12/2016 |
| KR | 10-1738979 | 6/2017 |
| KR | 10-2017-0116262 | 10/2017 |

OTHER PUBLICATIONS

Written Opinion of the ISA for PCT/KR2020/000412, mailed Apr. 24, 2020, 5 pages.
Korean Office Action issued Jul. 20, 2023 in corresponding Korean Patent Application No. 10-2019-0039879.
Office Action dated Jul. 24, 2024 in Korean Patent Application No. 10-2019-0039879 and English machine translation.

* cited by examiner

ELECTRONIC DEVICE FOR COMPENSATING FOR LOSS OF INTER FREQUENCY SIGNAL BETWEEN ANTENNA MODULE AND INTER FREQUENCY INTEGRATED CIRCUIT

CROSS-REFERENCE TO RELATED APPLICATIONS

This application is a continuation of International Application No. PCT/KR2020/00412 designating the United States, filed on Jan. 9, 2020, in the Korean Intellectual Property Receiving Office and claiming priority to Korean Patent Application No. 10-2019-0039879, filed on Apr. 5, 2019, in the Korean Intellectual Property Office, the disclosures of which are incorporated by reference herein in their entireties.

BACKGROUND

Field

The disclosure relates to a technology for implementing an electronic device that compensates for the loss of an inter frequency signal between an antenna module and an inter frequency integrated circuit.

Description of Related Art

As mobile communication technologies develop, an electronic device equipped with an antenna is being widely supplied. The electronic device may transmit and/or receive a radio frequency (hereinafter referred to as 'RF') signal including a voice signal or data (e.g., a message, a photo, a video, a music file, or a game) using the antenna. For example, the electronic device may perform communication using a high frequency (e.g., 5G millimeter wave (mm-Wave)). When high-frequency communication is performed, an antenna and a radio frequency integrated circuit (hereinafter referred to as 'RFIC'), which processes the transmitted and/or received RF signal, may be positioned in an antenna module to reduce increasing transmission losses on a transmission line. One or more RFICs may be arranged in the electronic device. To improve the radiation performance of the antenna, an RFIC may be preferably positioned in an area adjacent to a vertex of the electronic device from among edges of the electronic device.

It is not easy for an electronic device to modulate a high-frequency RF signal into a digital signal, which is directly processed by a modem, or to modulate the digital signal into an RF signal. Accordingly, the electronic device may modulate the high-frequency RF signal into an inter frequency (hereinafter referred to as 'IF') signal between the RF signal and the digital signal and then may modulate the inter frequency signal. Using an inter frequency integrated circuit (hereinafter referred to as 'IFIC'), the electronic device may modulate the RF signal delivered from an RFIC into an IF signal and then deliver the IF signal to the modem, or may modulate the digital signal delivered from the modem into the IF signal and then deliver the IF signal to the RFIC. The IFIC may be interposed between the modem and the at least one RFIC. The IFIC may be arranged in connection with the modem.

The IFIC may be connected to one or more RFICs. A transmission line for transmitting and/or receiving an IF signal may be interposed between the IFIC and the RFIC. For the electronic device, a loss tolerance value of the IF signal may be specified in advance in the transmission line.

When the size of the electronic device increases, that is, when the size of the display included in the electronic device increases, a distance between the IFIC and the RFIC may increase. When the distance between the IFIC and the RFIC increases, the length of the transmission line connecting between the IFIC and the RFIC increases. Accordingly, the loss value of an IF signal between the IFIC and the RFIC may increase.

SUMMARY

Embodiments of the disclosure provide an electronic device capable of compensating for the IF signal loss between the IFIC and the RFIC even though the length of the transmission line connecting between IFIC and RFIC increases.

According to an example embodiment of the disclosure, an electronic device may include: a plurality of radio frequency integrated circuits (RFICs) configured to deliver a digital signal, to be transmitted by a modem through an antenna transmitting and/or to receive a radio frequency (RF) signal, in a form of the RF signal and to deliver the RF signal received from the antenna in a direction of the modem, the plurality of RFICs being at least partially connected to one another, an inter frequency integrated circuit (IFIC) connected to at least one RFIC among the plurality of RFICs and configured to receive the digital signal from the modem, to convert the digital signal to an inter frequency (IF) signal, to deliver the IF signal to the RFIC, to convert the RF signal delivered from the RFIC to the IF signal, and to deliver the IF signal to the modem, and a plurality of compensation units comprising circuitry respectively connected to the plurality of RFICs or respectively positioned inside of the plurality of RFICs and configured to compensate for a loss of the IF signal occurring between the IFIC and the at least one RFIC or to compensate for a loss of the IF signal occurring between the plurality of RFICs.

According to an example embodiment of the disclosure, an electronic device may include: a communication processor (CP), an inter frequency integrated circuit (IFIC) connected to the CP using an in-phase/quadrature (I/Q) transmission line and an I/Q control signal line, a first radio frequency integrated circuit (RFIC) connected to the IFIC using a first transmission line, and a second RFIC connected to the first RFIC using a second transmission line. The first RFIC may include a first compensation unit comprising circuitry configured to compensate for a loss of an IF signal occurring on the first transmission line. The second RFIC may include a second compensation unit comprising circuitry configured to compensate for the loss of the IF signal on the second transmission line.

According to an example embodiment of the disclosure, an electronic device capable of being folded or unfolded in a first direction may include: an inter frequency integrated circuit (IFIC) positioned to not overlap a first folding line provided to cross the electronic device in a second direction perpendicular to the first direction, and first, second, third and fourth radio frequency integrated circuits (RFICs) positioned to not overlap the first folding line. Each of the first, second, third and fourth RFICs may include a compensation units comprising circuitry configured to compensate for a loss of an IF signal occurring between the IFIC and the first, second, third and fourth RFICs. The first and second RFICs may be diagonally arranged at vertices of a first area in the first area which is divided based on the first folding line with respect to the first direction and the second direction. The third and fourth RFICs may be diagonally arranged at vertices of a second area in the second area which is divided based on the first folding line with respect to the first direction and the second direction. The first to fourth RFICs may be positioned adjacent to an edge of the electronic device with respect to the first direction and the second direction.

According to various example embodiments of the disclosure, a compensation unit includes circuitry that is capable of amplifying an IF signal as much as the IF signal is lost. Accordingly, the loss of the IF signal between an IFIC and an RFIC may be compensated even though a length of a transmission line connecting between the IFIC and the RFIC increases.

BRIEF DESCRIPTION OF THE DRAWINGS

The above and other aspects, features and advantages of certain embodiments of the present disclosure will be more apparent from the following detailed description, taken in conjunction with the accompanying drawings, in which.

With regard to description of drawings, the same or similar components will be marked by the same or similar reference signs.

DETAILED DESCRIPTION

Hereinafter, various example embodiments of the disclosure may be described with reference to accompanying drawings. However, those of ordinary skill in the art will recognize that modification, equivalent, and/or alternative on various embodiments described herein may be variously made without departing from the scope and spirit of the disclosure.

Figure 1:
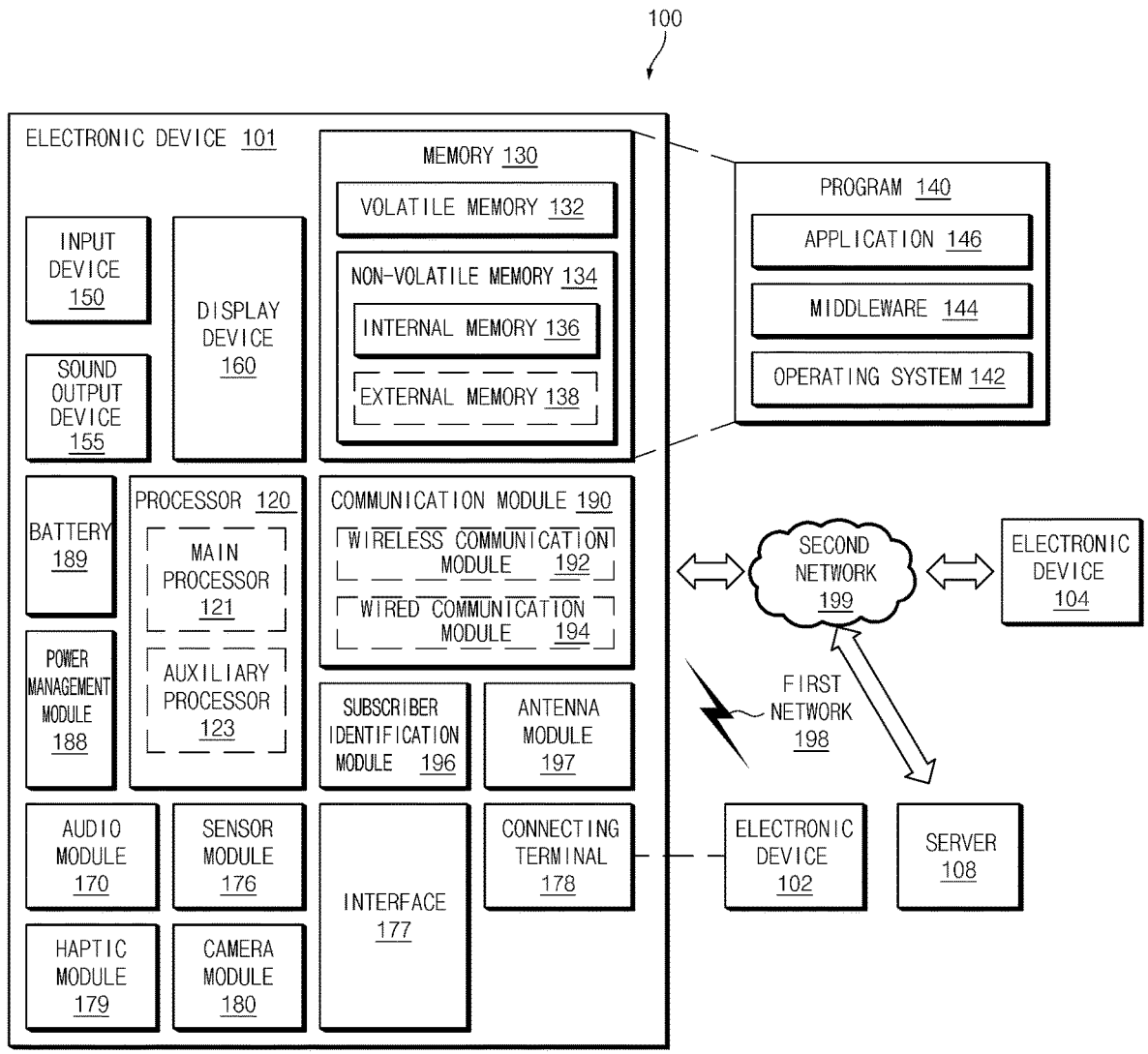
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
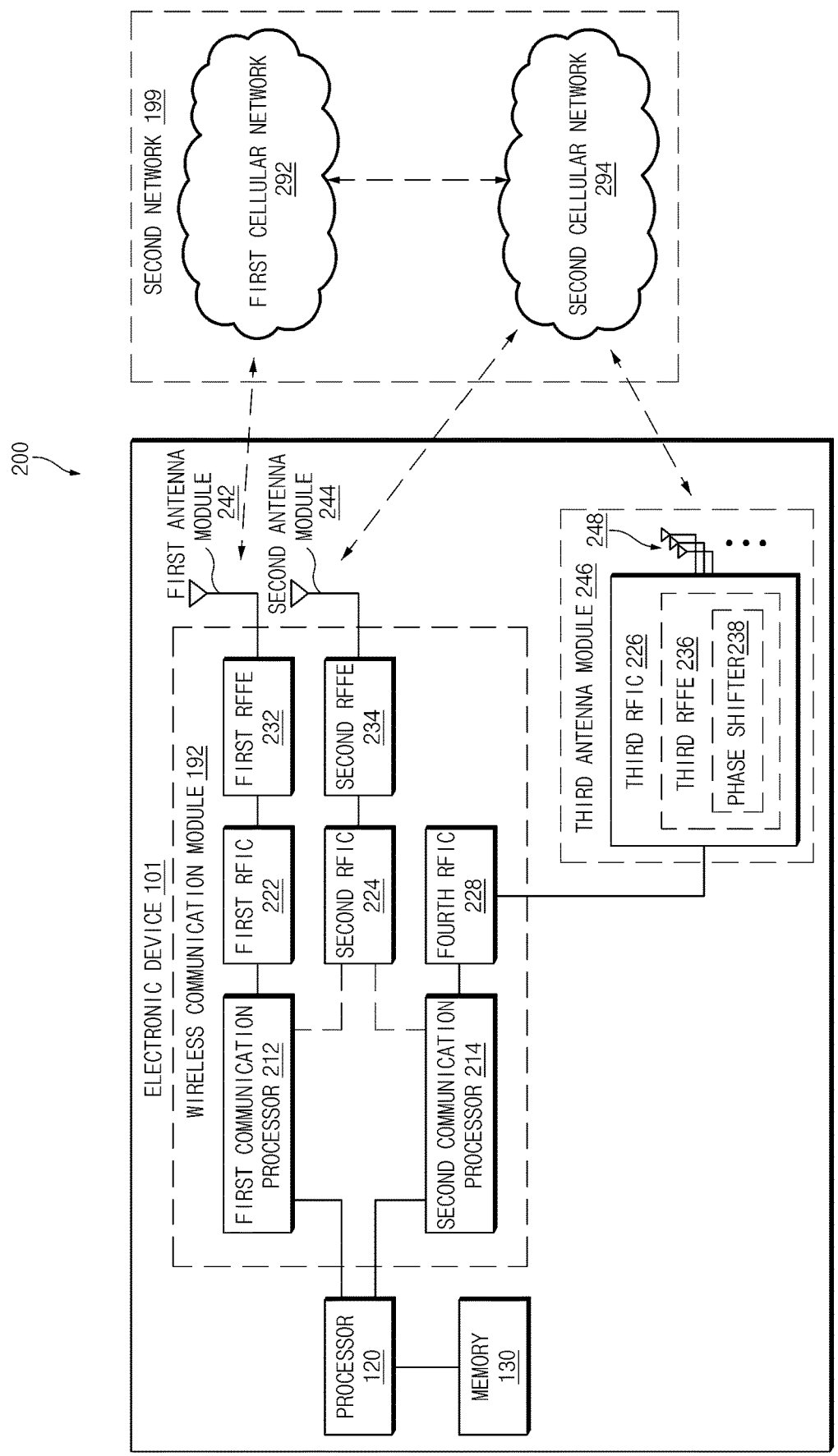
FIG. 2 is a block diagram illustrating an example configuration of an electronic device for supporting legacy network communication and 5G network communication, according to various embodiments.

FIG. 2 is a block diagram 200 illustrating an example configuration of the electronic device 101 for supporting legacy network communication and 5G network communication, according to various embodiments. Referring to FIG. 2, the electronic device 101 may include a first communication processor (e.g., including processing circuitry) 212, a second communication processor (e.g., including processing circuitry) 214, a first RFIC 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include the processor 120 and the memory 130. The network 199 may include a first network 292 and a second network 294. According to another embodiment, the electronic device 101 may further include at least one component not illustrated in FIG. 1, and the network 199 may further include at least another network. According to an embodiment, the first communication processor 212, the second communication processor 214, the first RFIC 222, the second RFIC 224, the fourth RFIC 228, the first RFFE 232, and the second RFFE 234 may form at least part of the wireless communication module 192. According to another embodiment, the fourth RFIC 228 may be omitted or may be included as a part of the third RFIC 226.

The first communication processor 212 may establish a communication channel for a band to be used for wireless communication with the first network 292 and may support legacy network communication through the established communication channel. According to various embodiments, the first network may be a legacy network including a 2nd generation (2G), 3G, 4G, or long term evolution (LTE) network. The second communication processor 214 may establish a communication channel corresponding to a specified band (e.g., ranging from approximately 6 GHz to approximately 60 GHz) of bands to be used for wireless communication with the second network 294 and may support 5G network communication through the established communication channel. According to various embodiments, the second network 294 may be a 5G network defined in 3GPP. Additionally, according to an embodiment, the first communication processor 212 or the second communication processor 214 may establish a communication channel corresponding to another specified band (e.g., approximately 6 GHz or lower) among the bands to be used for wireless communication with the second network 294 and may support 5G network communication through the established communication channel. According to an embodiment, the first communication processor 212 and the second communication processor 214 may be implemented within a single chip or a single package. According to various embodiments, the first communication processor 212 or the second communication processor 214 may be implemented within a single chip or a single package together with the processor 120, the auxiliary processor 123, or the communication module 190.

In the case of transmitting a signal, the first RFIC 222 may convert a baseband signal generated by the first communication processor 212 into a radio frequency (RF) signal of approximately 700 MHz to approximately 3 GHz that is used in the first network 292 (e.g., a legacy network). In the case of receiving a signal, an RF signal may be obtained from the first network 292 (e.g., a legacy network) through an antenna (e.g., the first antenna module 242) and may be pre-processed through an RFFE (e.g., the first RFFE 232). The first RFIC 222 may convert the preprocessed RF signal to a baseband signal so as to be processed by the first communication processor 212.

In the case of transmitting a signal, the second RFIC 224 may convert a baseband signal generated by the first communication processor 212 or the second communication processor 214 into an RF signal (hereinafter referred to as a "5G Sub6 RF signal") in a Sub6 band (e.g., approximately 6 GHz or lower) used in the second network 294 (e.g., a 5G network). In the case of receiving a signal, the 5G Sub6 RF signal may be obtained from the second network 294 (e.g., a 5G network) through an antenna (e.g., the second antenna module 244) and may be preprocessed through an RFFE (e.g., the second RFFE 234). The second RFIC 224 may convert the preprocessed 5G Sub6 RF signal into a baseband signal so as to be processed by a corresponding communication processor of the first communication processor 212 or the second communication processor 214.

The third RFIC 226 may convert a baseband signal generated by the second communication processor 214 into an RF signal (hereinafter referred to as a "5G Above6 RF signal") in a 5G Above6 band (e.g., approximately 6 GHz to approximately 60 GHz) to be used in the second network 294 (e.g., a 5G network). In the case of receiving a signal, the 5G Above6 RF signal may be obtained from the second network 294 (e.g., a 5G network) through an antenna (e.g., the antenna 248) and may be preprocessed through a third RFFE 236. The third RFIC 226 may convert the preprocessed 5G Above 6 RF signal to a baseband signal so as to be processed by the second communication processor 214. According to an embodiment, the third RFFE 236 may be implemented as a part of the third RFIC 226. The third RFFE 236 may include a phase shifter 238 that converts a baseband signal into a 5G Above6 RF signal or converts the 5G Above6 RF signal into the baseband signal.

According to an embodiment, the electronic device 101 may include the fourth RFIC 228 independently of the third RFIC 226 or as at least a part of the third RFIC 226. In this case, the fourth RFIC 228 may convert a baseband signal generated by the second communication processor 214 into an RF signal (hereinafter referred to as an "IF signal") in an intermediate frequency band (e.g., approximately 9 GHz to approximately 11 GHz) and may provide the IF signal to the third RFIC 226. The third RFIC 226 may convert the IF signal to the 5G Above6 RF signal. In the case of receiving a signal, the 5G Above6 RF signal may be received from the second network 294 (e.g., a 5G network) through an antenna (e.g., the antenna 248) and may be converted into an IF signal by the third RFIC 226. The fourth RFIC 228 may convert the IF signal into a baseband signal to be processed by the second communication processor 214.

According to an embodiment, the first RFIC 222 and the second RFIC 224 may be implemented as at least a part of a single package or a single chip. According to an embodiment, the first RFFE 232 and the second RFFE 234 may be implemented as at least part of a single chip or a single package. According to an embodiment, at least one of the first antenna module 242 or the second antenna module 244 may be omitted or may be combined with any other antenna module to process RF signals in a plurality of bands.

According to an embodiment, the third RFIC 226 and the antenna 248 may be disposed on the same substrate to form a third antenna module 246. For example, the wireless communication module 192 or the processor 120 may be disposed at a first substrate (e.g., a main PCB). In this case, the third RFIC 226 may be disposed in a partial region (e.g., on a lower surface) of a second substrate (e.g., a sub PCB) independent of the first substrate, and the antenna 248 may be disposed in another partial region (e.g., on an upper surface) of the second substrate. As such, the third antenna module 246 may be formed. According to an embodiment, the antenna 248 may include, for example, an antenna array capable of being used for beamforming. As the third RFIC 226 and the antenna 248 are disposed at the same substrate, it may be possible to decrease a length of a transmission line between the third RFIC 226 and the antenna 248. For example, the decrease in the transmission line may make it possible to prevent and/or reduce a signal in a high-frequency band (e.g., approximately 6 GHz to approximately 60 GHz) used for the 5G network communication from being lost (or attenuated) due to the transmission line. As such, the electronic device 101 may improve the quality or speed of communication with the second network 294 (e.g., a 5G network).

The second network 294 (e.g., a 5G network) may be used independently of the first network 292 (e.g., a legacy network) (e.g., stand-alone (SA)) or may be used in conjunction with the first network 292 (e.g., non-stand alone (NSA)). For example, only an access network (e.g., a 5G radio access network (RAN) or a next generation RAN (NG RAN)) may be present in the 5G network, and a core network (e.g., a next generation core (NGC)) may be absent from the 5G network. In this case, the electronic device 101 may access the access network of the 5G network and may then access an external network (e.g., Internet) under control of a core network (e.g., an evolved packed core (EPC)) of the legacy network. Protocol information (e.g., LTE protocol information) for communication with the legacy network or protocol information (e.g., New Radio (NR) protocol information) for communication with the 5G network may be stored in the memory 130 so as to be accessed by any other component (e.g., the processor 120, the first communication processor 212, or the second communication processor 214).

Figure 3A:
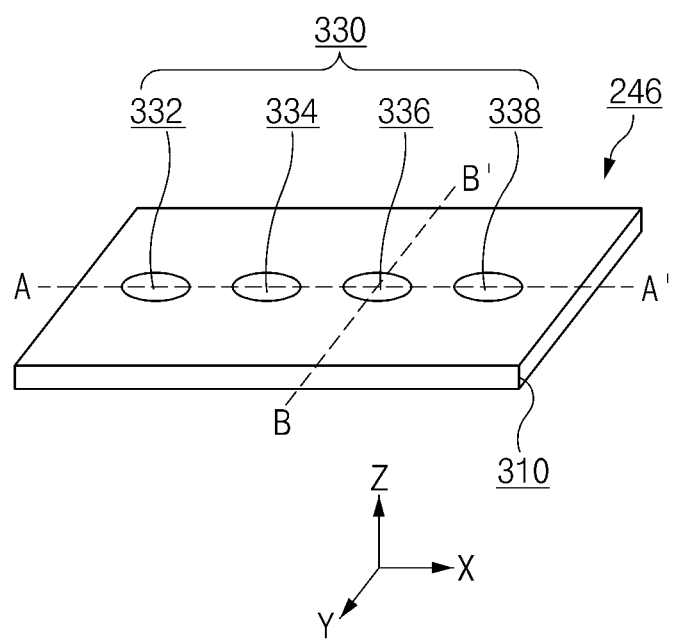
FIG. 3A is a perspective view of a third antenna module when viewed from one side according to various embodiments.
Figure 3B:
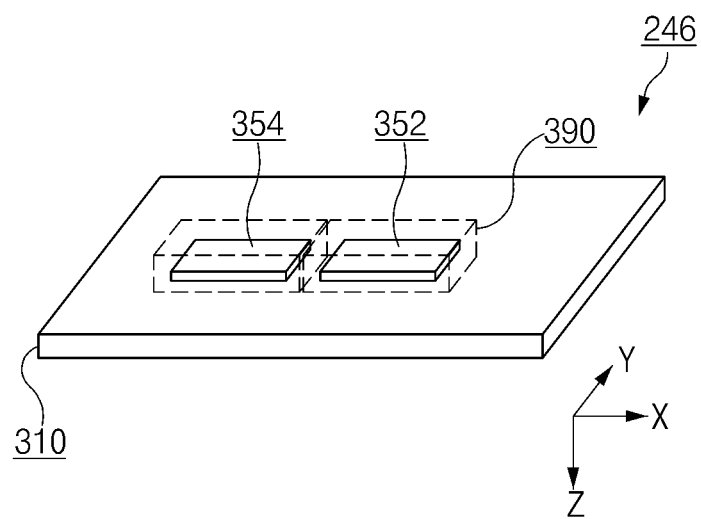
FIG. 3B is a perspective view of a third antenna module when viewed from another side according to various embodiments.
Figure 3C:
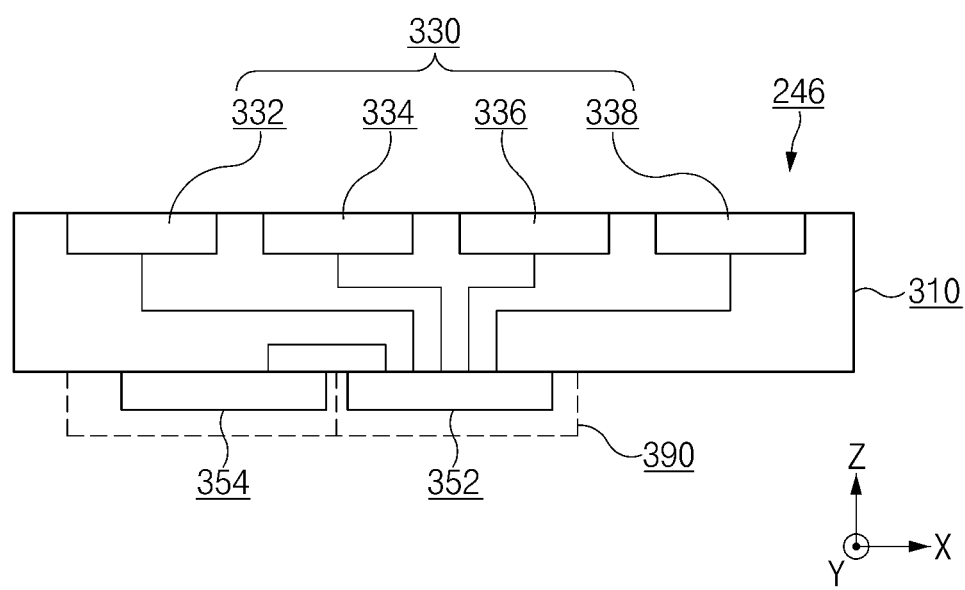
FIG. 3C is a cross-sectional view of a third antenna module taken along a line A-A' according to various embodiments.

FIGS. 3A, 3B and 3C are diagrams illustrating an example of a third antenna module 246 described with reference to FIG. 2, for example. FIG. 3A is a perspective view of the third antenna module 246 when viewed from one side according to various embodiments, and FIG. 3B is a perspective view of the third antenna module 246 when viewed from another side according to various embodiments. FIG. 3C is a cross-sectional view of the third antenna module 246 taken along line A-A'.

Referring to FIGS. 3A, 3B and 3C, in an embodiment, the third antenna module 246 may include a printed circuit board 310, an antenna array 330, a RFIC 352, a power manage integrated circuit (PMIC) 354, and/or a module interface for operating the third antenna module 246. Selectively, the third antenna module 246 may further include a shielding member 390. In various embodiments, at least one of the above components may be omitted, or at least two of the components may be integrally formed.

The printed circuit board 310 may include a plurality of conductive layers and a plurality of non-conductive layers, and the conductive layers and the non-conductive layers may be alternately stacked. The printed circuit board 310 may provide an electrical connection between the printed circuit board 310 and/or various electronic components disposed on the outside using wires and conductive vias formed in the conductive layers.

The antenna array 330 (e.g., 248 of FIG. 2) may include a plurality of antenna elements 332, 334, 336, and 338 disposed to form a directional beam. As illustrated in drawings, the antenna elements may be formed on a first surface of the printed circuit board 310 as illustrated. According to another embodiment, the antenna array 330 may be formed within the printed circuit board 310. According to embodiments, the antenna array 330 may include a plurality of antenna arrays (e.g., a dipole antenna array and/or a patch antenna array) that are identical or different in shape or kind.

The RFIC 352 (e.g., 226 of FIG. 2) may be disposed on another region (e.g., a second surface facing away from the first surface) of the printed circuit board 310 so as to be spaced from the antenna array. The RFIC is configured to process a signal in a selected frequency band, which is transmitted/received through the antenna array 330. According to an embodiment, in the case of transmitting a signal, the RFIC 352 may convert a baseband signal obtained from a communication processor (not illustrated) into an RF signal in a specified band. In the case of receiving a signal, the RFIC 352 may convert an RF signal received through the antenna array 330 into a baseband signal and may provide the baseband signal to the communication processor.

According to another embodiment, in the case of transmitting a signal, the RFIC 352 may up-convert an IF signal (e.g., approximately 9 GHz to approximately 11 GHz) obtained from an intermediate frequency integrated circuit (IFIC) (e.g., 228 of FIG. 2) into an RF signal. In the case of receiving a signal, the RFIC 352 may down-convert an RF signal obtained through the antenna array 330 into an IF signal and may provide the IF signal to the IFIC.

The PMIC 354 may be disposed in another region (e.g., on the second surface) of the printed circuit board 310, which is spaced from the antenna array. The PMIC 354 may be supplied with a voltage from a main PCB (not illustrated) and may provide a power necessary for various components (e.g., the RFIC 352) above an antenna module.

The shielding member 390 may be disposed at a portion (e.g., on the second surface) of the printed circuit board 310 such that at least one of the RFIC 352 or the PMIC 354 is electromagnetically shielded. According to an embodiment, the shielding member 390 may include a shield can.

Although not illustrated in drawings, in various embodiments, the third antenna module 246 may be electrically connected with another printed circuit board (e.g., a main circuit board) through a module interface. The module interface may include a connection member, for example, a coaxial cable connector, a board to board connector, an interposer, or a flexible printed circuit board (FPCB). The RFIC 352 and/or the PMIC 354 of the antenna module may be electrically connected with the printed circuit board 310 through the connection member.

Figure 4:
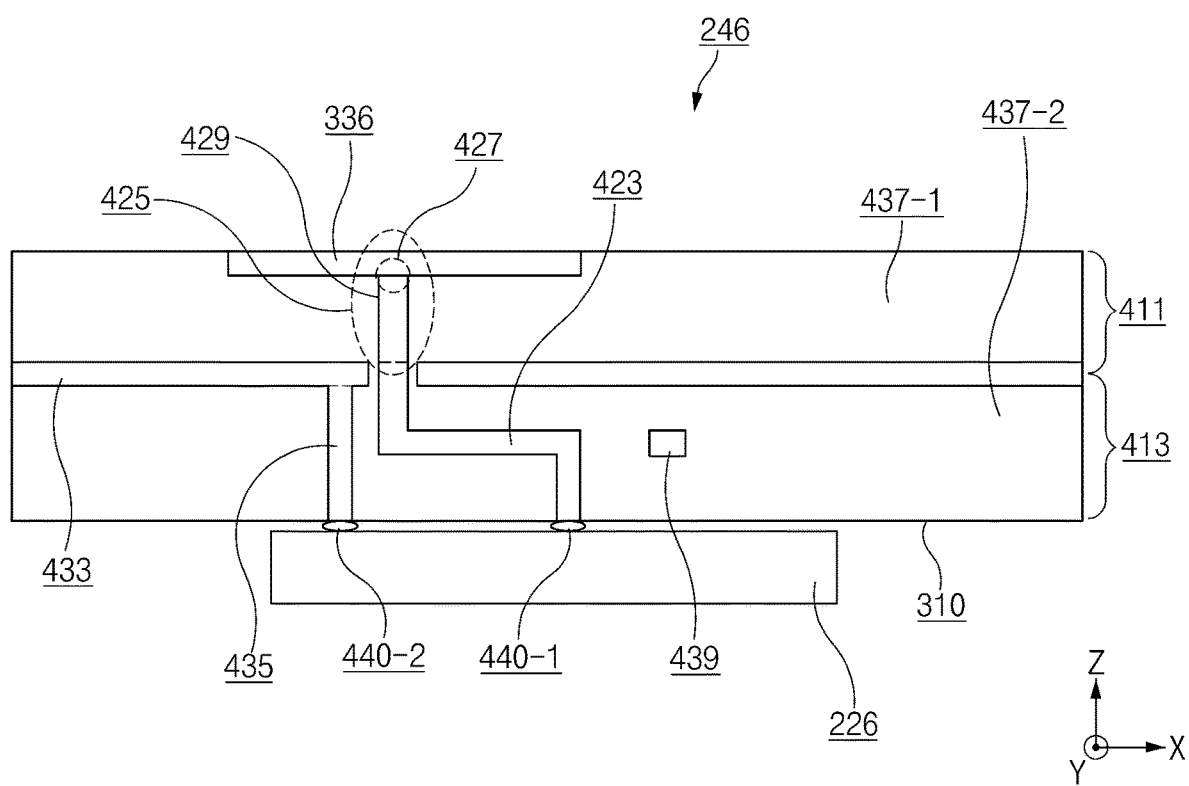
FIG. 4 is a cross-sectional view of a third antenna module taken along a line B-B' of FIG. 3A according to various embodiments.

FIG. 4 is a cross-sectional view of the third antenna module 246 taken along a line B-B' of FIG. 3A according to various embodiments. Referring to FIG. 4, a printed circuit board 310 may include an antenna layer 411 and a network layer 413.

The antenna layer 411 may include at least one dielectric layer 437-1, and the antenna element 336 and/or a feeding part 425 formed on an outer surface of the dielectric layer 437-1 or therein. The feeding part 425 may include a feeding point 427 and/or a feeding line 429.

The network layer 413 may include at least one dielectric layer 437-2 and at least one ground layer 433, at least one conductive via 435, a transmission line 423, and/or a signal line 439 formed on an outer surface of the dielectric layer 437-2 or therein.

In addition, in the embodiment illustrated, the third RFIC 226 of FIG. 2 may be electrically connected with the network layer 413, for example, through first and second connection parts (e.g., solder bumps) 440-1 and 440-2. In other embodiments, various connection structures (e.g., soldering or a ball grid array (BGA)) may be utilized instead of the connection part. The third RFIC 226 may be electrically connected with the antenna element 336 through the first connection part 440-1, a transmission line 423, and the feeding part 425. Also, the third RFIC 226 may be electrically connected to the ground layer 433 through the second connection part 440-2 and a conductive via 435. Although not illustrated in drawings, the third RFIC 226 may also be electrically connected with the above module interface through the signal line 439.

Figure 5:
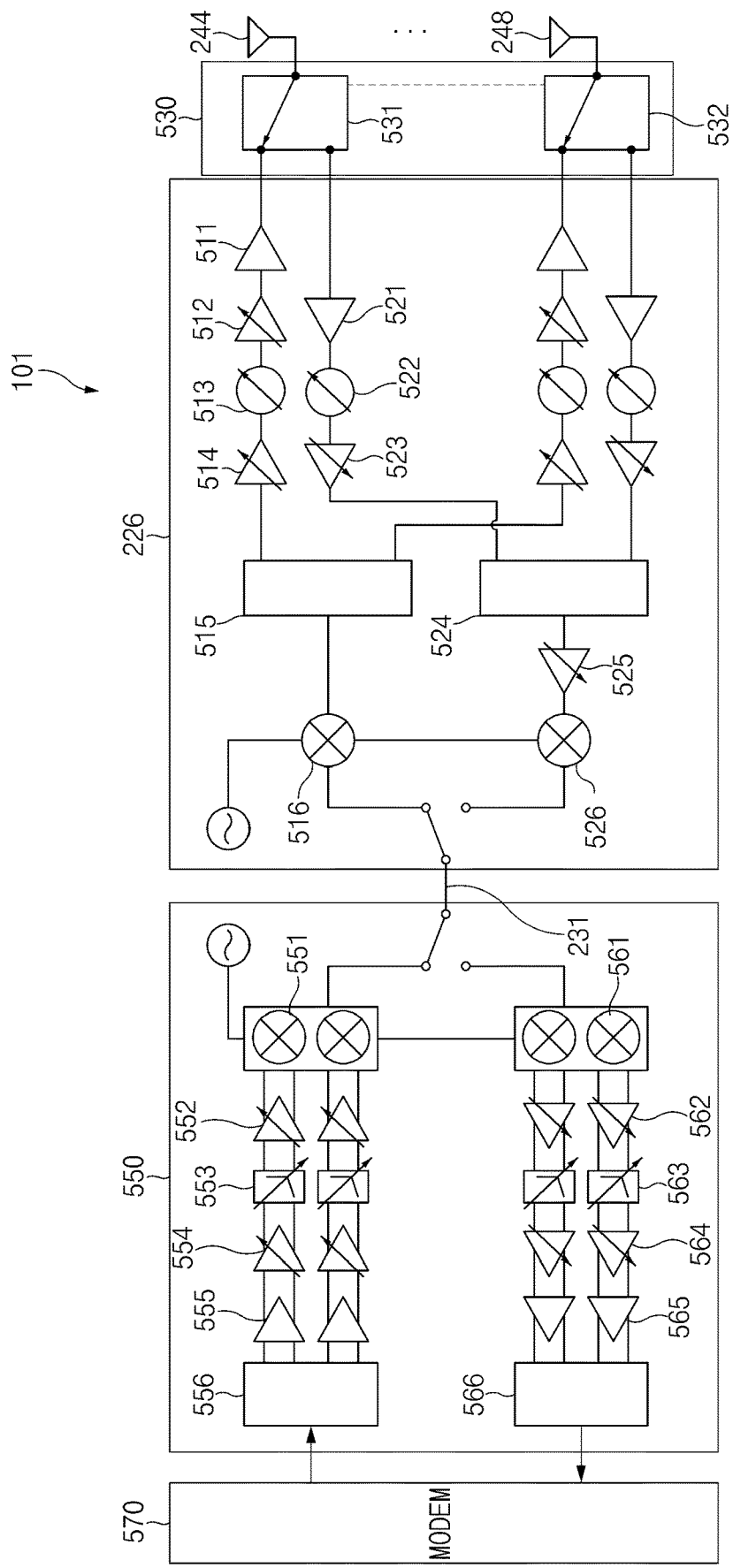
FIG. 5 is a diagram illustrating antennas, an RFIC, an IFIC, and a modem of an electronic device, according to various embodiments.

FIG. 5 is a diagram illustrating antennas 244 and 248, an RFIC 226 (e.g., the third RFIC 226 of FIG. 2), an IFIC 550, and a modem 570 of the electronic device 101, according to various embodiments.

In an embodiment, the antennas 244 and 248 may include the first antenna element 244 and the second antenna element 248. The first and second antenna elements 244 and 248 may be connected to the RFIC 226 through a switching unit 530 including first and second switches 531 and 532. For example, when the electronic device 101 transmits a signal delivered from the modem 570 using the first antenna element 244, the first switch 531 may connect the first antenna element 244 and a power amplifier 511. As another example, when the electronic device 101 receives a signal using the first antenna element 244 and delivers the signal to the modem 570, the first switch 531 may connect the first antenna element 244 and a low noise amplifier (LNA) 521.

In an embodiment, the RFIC 226 may deliver a transmit signal to be transmitted by the modem 570 to the first and second antenna elements 244 and 248, and may deliver the receive signal received from the first and second antenna elements 244 and 248 to the IFIC 550.

In an embodiment, the IFIC 550 may be connected to the RFIC 226. The IFIC 550 may receive a transmit signal from the modem 570 and may deliver the transmit signal to the RFIC 226 and may deliver a receive signal delivered from the RFIC 226 to the modem 570. The IFIC 550 may be included in another RFIC (e.g., the fourth RFIC 228 of FIG. 2).

In an embodiment, the modem 570 may be connected to the IFIC 550. The modem 570 may deliver a transmit signal to the IFIC 550 or may receive a receive signal from the IFIC 550. The modem 570 may include a communication processor (e.g., the second communication processor 214 of FIG. 2).

Hereinafter, a path (hereinafter referred to as a "transmit path") through which the first and second antenna elements 244 and 248 transmit a transmit signal by delivering the transmit signal from the modem 570 to the first and second antenna elements 244 and 248 will be described. A path (hereinafter referred to as a "receive path") through which the first and second antenna elements 244 and 248 receive a receive signal and deliver the receive signal to the modem 570 will be described.

In an embodiment, the power amplifier 511, a first variable gain amplifier (VGA) 512 a phase shifter 513, a second VGA 514, a TX splitter 515, and a mixer 516 may be positioned on the transmit path.

In an embodiment, the power amplifier 511 may amplifier power of the transmit signal. The first VGA 512 and the second VGA 514 may perform a TX auto gain control (AGC) operation under control of the modem 570. The RFIC 226 may include at least one or more VGAs. The phase shifter 513 may shift a phase of a signal based on a beamforming angle under control of the modem 570.

In an embodiment, the TX splitter 515 may split a transmit signal provided from the mixer 516 into "n" signals. The mixer 516 may convert a Tx I/Q (in-phase/quadrature) signal received from the IFIC 550 into a transmit signal. The mixer 516 may receive a signal to be mixed from an oscillator outside or inside the RFIC 226.

In an embodiment, the LNA 521, a phase shifter 522, a first VGA 523, a combiner 524, a second VGA 525, and a mixer 526 may be positioned on the receive path.

The LNA 521 may amplify a signal received from the antenna 244. The first VGA 523 and the second VGA 525 may perform a RX AGC operation under control of the modem 570. The phase shifter 522 may shift a phase of a signal based on a beamforming angle under control of the modem 570.

In an embodiment, the combiner 524 may combine signals, which are aligned to have the same phase, through a phase shift operation. The combined signal may be provided to the mixer 526 through the second VGA 525. The mixer 526 may convert the received signal from an RF band into an IF band. The mixer 526 may receive a signal to be mixed from an oscillator outside or inside the RFIC 226.

In an embodiment, a conductive line 231 that selectively connects the transmit path or the receive path may be positioned in a back-end of the mixer 516 in the RFIC 226. It may not be easy to connect the RFIC 226 and the IFIC 550 with a transmission line when an inter frequency is high. In the case where the conductive line 231 selectively connects the transmit path or the receive path, the number of transmission lines between the RFIC 226 and the IFIC 550 may decrease.

In an embodiment, a mixer 551, a third VGA 552, a low pass filter (LPF) 553, a fourth VGA 554, and a buffer 555 may be positioned on the transmit path in the IFIC 550. The buffer 555 may function as a buffer in receiving a Tx I/Q signal from a transmit signal generator 556, thus making it possible to process the signal stably. The third VGA 552 and the fourth VGA 554 may perform the TX AGC operation under control of the modem 570. The LPF 553 may function as a noise filter by setting a bandwidth of a baseband transmit signal to a cutoff frequency. The cutoff frequency may be designated according to a transmit frequency that the modem 570 uses. The mixer 551 may convert the Tx I/Q signal to a Tx-IF signal.

In an embodiment, a mixer 561, a third VGA 562, an LPF 563, a fourth VGA 564, and a buffer 565 may be positioned on the receive path in the IFIC 550. The buffer 565 may function as a buffer upon providing an Rx I/Q signal to a receive signal processor 566 from the fourth VGA 564, thus making it possible to process a signal stably. The third VGA 562 and the fourth VGA 564 may perform the RX AGC operation under control of the communication module 190. The LPF 563 may function as a noise filter by setting a bandwidth of a baseband receive signal to a cutoff frequency. The cutoff frequency may be designated according to a receive frequency that the communication module 190 uses. The mixer 561 may convert the Rx-IF signal into an Rx I/Q signal.

Figure 6:
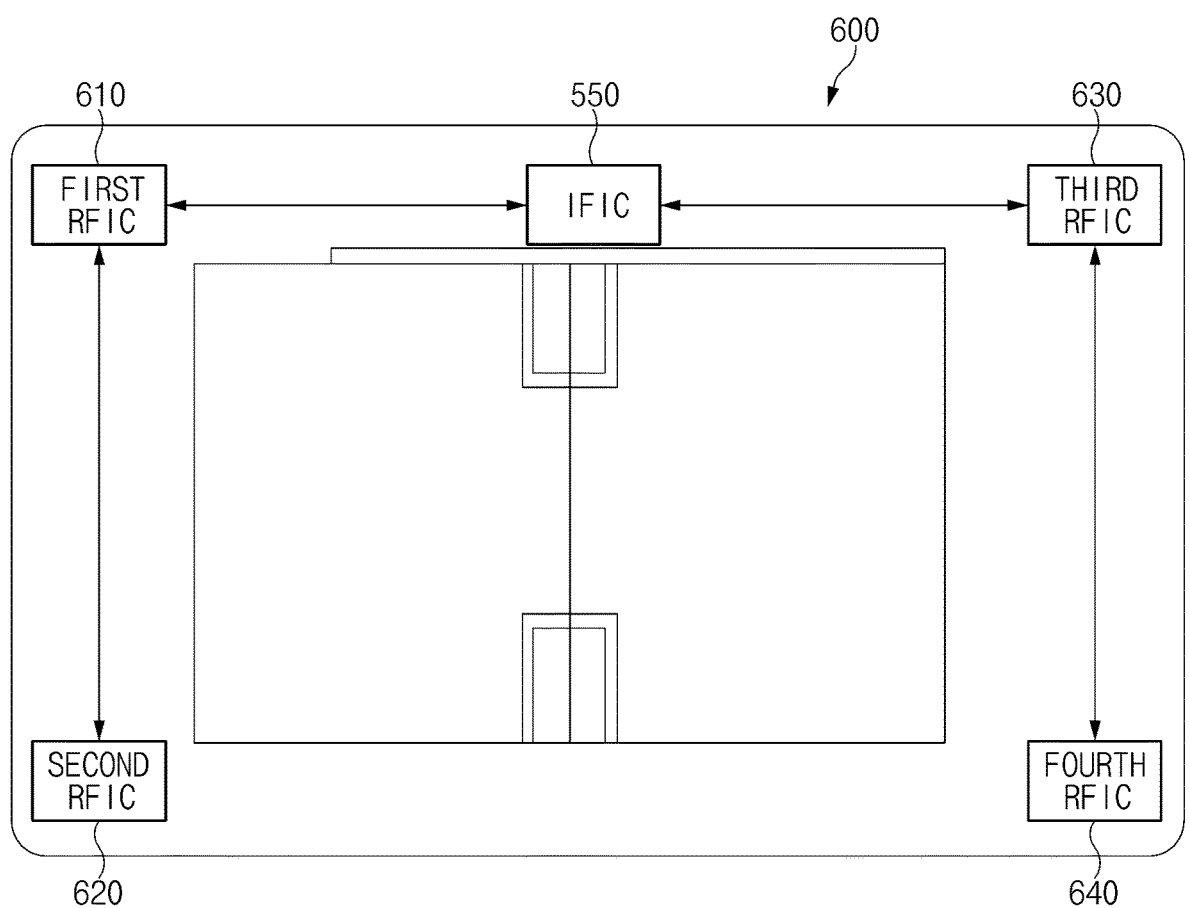
FIG. 6 is a diagram illustrating an IFIC and first to fourth RFICs of an electronic device, according to various embodiments.

FIG. 6 is a diagram 600 illustrating the IFIC 550 and first, second, third and fourth RFICs 610, 620, 630, and 640 of the electronic device 101, according to various embodiments. FIG. 6 illustrates that the four RFICs 610, 620, 630, and 640 are arranged in the electronic device 101. However, the disclosure is not limited thereto, and the electronic device 101 may include a plurality of RFICs 610, 620, 630, and 640.

In an embodiment, the IFIC 550 may be a module or chip including an IFIC (e.g., the IFIC 550 in FIG. 5). The IFIC 550 may be positioned at an edge of one side of the electronic device 101. The IFIC 550 may receive a digital signal from a modem (e.g., the modem 570 in FIG. 5). The IFIC 550 may convert the digital signal into an analog IF signal.

In an embodiment, each of the first to fourth RFICs 610, 620, 630, and 640 may include an antenna element (e.g., the first and second antenna elements 244 and 248 of FIG. 5) and an RFIC (e.g., the RFIC 226 of FIG. 5). The first to fourth RFICs 610, 620, 630, and 640 may be arranged in an area adjacent to a vertex of the electronic device 101 among edges of the electronic device 101.

In an embodiment, the first and third RFICs 610 and 630 may be directly connected to the IFIC 550. The first RFIC 610 may receive or deliver a first IF signal, which is used by the first RFIC 610, and a second IF signal, which is used by the second RFIC 620, from or to the IFIC 550. The third RFIC 630 may receive or deliver a third IF signal, which is used in the third RFIC 630, and a fourth IF signal, which is used by the fourth RFIC 640, from or to the IFIC 550.

In an embodiment, the second RFIC 620 may be connected to the first RFIC 610. The second RFIC 620 may receive the second IF signal from the first RFIC 610 or may deliver the second IF signal. The fourth RFIC 640 may be connected to the third RFIC 630. The fourth RFIC 640 may receive the fourth IF signal from the third RFIC 630 or may deliver the fourth IF signal. The second and fourth RFICs 620 and 640 may receive or deliver the second and fourth IF signals through the first and third RFICs 610 and 630, respectively. Accordingly, the second and fourth RFICs 620 and 640 may not be directly connected to the IFIC 550. When a distance between the second RFIC 620 and the first RFIC 610 or between the fourth RFIC 640 and the third RFIC 630 increases, the loss of each of the second and fourth IF signals may increase on a transmission line connecting between the second RFIC 620 and the first RFIC 610 or between the fourth RFIC 640 and the third RFIC 630.

FIG. 6 illustrates that the first and third RFICs 610 and 630 are directly connected to the IFIC 550, and the second and fourth RFICs 620 and 640 are connected to the first and third RFICs 610 and 630, respectively. However, the disclosure is not limited thereto. The first and second RFICs 610 and 620 may be directly connected to the IFIC 550, and the third and fourth RFICs 630 and 640 may be connected to the first and second RFICs 610 and 620, respectively. As such, when at least one RFIC are connected to the remaining RFICs, the overall length of the transmission line may be reduced as compared with a structure in which all of the RFICs 610, 620, 630, and 640 are directly connected to the IFIC 550. Accordingly, it is possible to reduce the cost required for the design of the transmission line.

Figure 7:
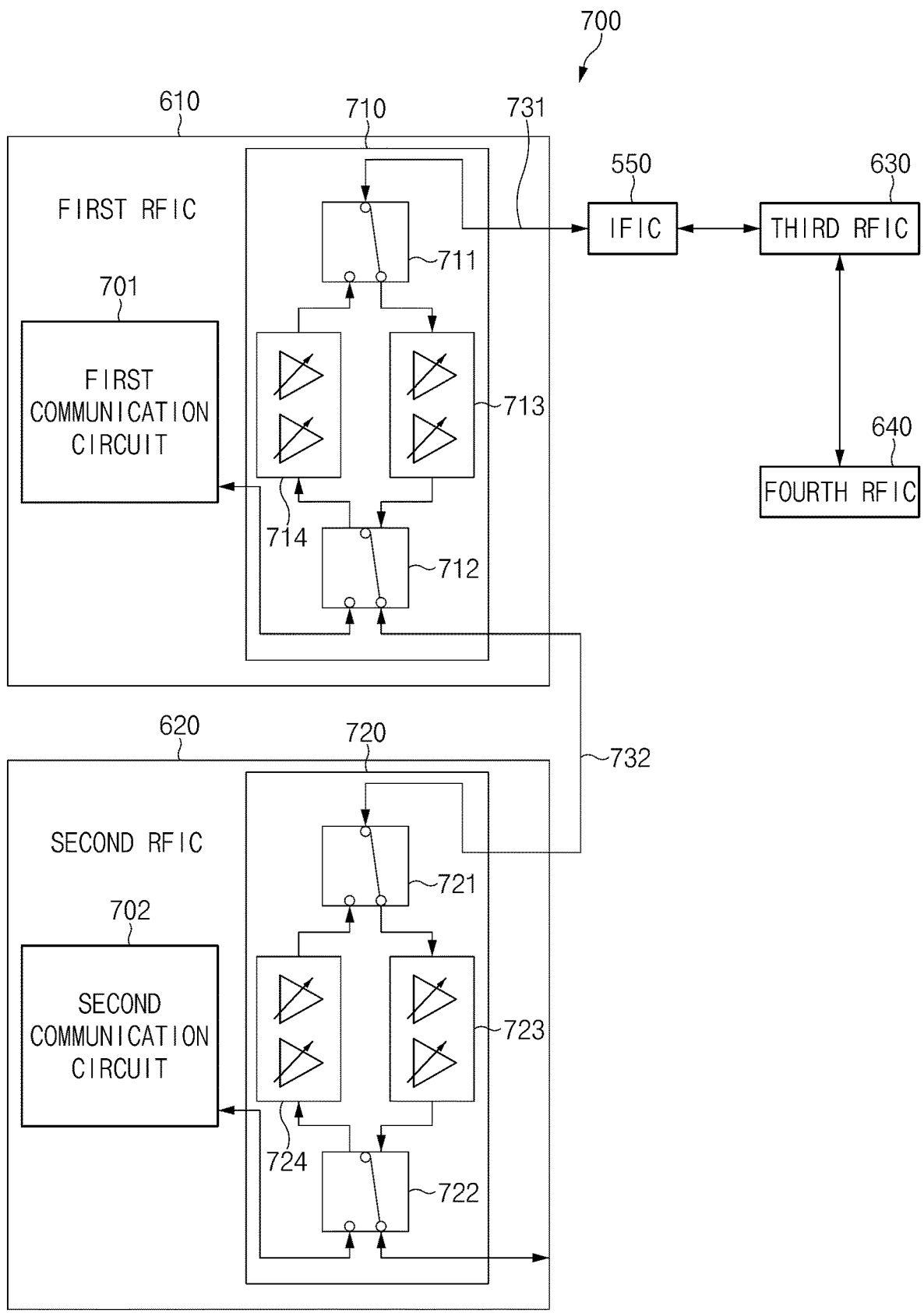
FIG. 7 is a circuit diagram illustrating first and second RFICs, according to various embodiments.

FIG. 7 is a circuit diagram 700 illustrating the first and second RFICs 610 and 620, according to various embodiments. FIG. 7 illustrates that the first and second RFICs 610 and 620 do not support Multi Input Multi Output (hereinafter referred to as "MIMO").

In an embodiment, the first RFIC 610 may include a first communication circuit 701 and a first compensation unit (e.g., including circuitry) 710. The first communication circuit 701 in the first RFIC 610 may perform substantially the same function as the third the RFIC 226 of FIG. 2.

In an embodiment, the first compensation unit 710 may be connected to the IFIC 550. The first compensation unit 710 may include various circuitry and transmit and/or receive first and second IF signals from and/or to the IFIC 550. When a distance between the IFIC 550 and the first RFIC 610 increases, the loss of each of the first and second IF signals on the first transmission line 731 connecting the IFIC 550 and the first RFIC 610 may increase. The first compensation unit 710 may compensate for the loss of each of the first and second IF signals delivered from the IFIC 550 to the first RFIC 610 or from the first RFIC 610 to the IFIC 550.

The first compensation unit 710 may transmit or receive the first IF signal, which is obtained by compensating for the loss, to or from the first communication circuit 701 in the first RFIC 610. The first compensation unit 710 may transmit or receive the second IF signal, which is obtained by compensating for the loss, to or from the second RFIC 620. The first compensation unit 710 may include a first switch circuit 711, a second switch circuit 712, a first amplification circuit 713, and a second amplification circuit 714.

In an embodiment, the first switch circuit 711 may be selectively connected to the first amplification circuit 713 or the second amplification circuit 714 depending on whether the first and second IF signals are transmit signals or receive signals. For example, when the first and second IF signals are delivered from the IFIC 550 to the first compensation unit 710, the first switch circuit 711 may be connected to the first amplification circuit 713. As another example, when the first and second IF signals are delivered from the first compensation unit 710 to the IFIC 550, the first switch circuit 711 may be connected to the second amplification circuit 714.

In an embodiment, the second switch circuit 712 may allow the first communication circuit 701 included in the first RFIC 610 to transmit and/or receive a first IF signal. The second switch circuit 712 may allow the second IF signal to bypass the first RFIC 610 and may allow the second RFIC 620 to transmit and/or receive the second IF signal. For example, when the first IF signal is delivered from the IFIC 550 to the first compensation unit 710 or from the first compensation unit 710 to the IFIC 550, the second switch circuit 712 may be connected to the first communication circuit 701 such that the first communication circuit 701 transmits and/or receives the first IF signal. As another example, when the second IF signal is delivered from the IFIC 550 to the first compensation unit 710 or from the first compensation unit 710 to the IFIC 550, the second switch circuit 712 may be connected to the second RFIC 620 such that the second RFIC 620 transmits and/or receives the second IF signal.

In an embodiment, the first amplification circuit 713 may amplify the first and second IF signals, which are delivered from the IFIC 550 to the first compensation unit 710, based on the degree of loss of an IF signal occurring on the first transmission line 731. For example, the first compensation unit 710 may store first information associated with the degree of loss of an IF signal predetermined by the physical characteristics of the first transmission line 731. The first compensation unit 710 may set a gain value of the first amplification circuit 713 based on the first information such that the first amplification circuit 713 amplifies the first and second IF signals so as to have substantially the same magnitude as before the loss occurs. As another example, whenever an IF signal is transmitted or received on the first transmission line 731, the IFIC 550 may provide the first compensation unit 710 with second information associated with the degree of loss occurring while the IF signal is transmitted or received. The first compensation unit 710 may set a gain value of the first amplification circuit 713 based on the second information obtained from the IFIC 550 such that the first amplification circuit 713 amplifies the first and second IF signals so as to have substantially the same magnitude as before the loss occurs. On the basis of the set gain value, the first amplification circuit 713 may amplify the first and second IF signals so as to have substantially the same magnitude as before the loss occurs.

In an embodiment, the second amplification circuit 714 may amplify the first and second IF signals, which are delivered from the first compensation unit 710 to the IFIC 550, based on the degree of loss of an IF signal occurring on the first transmission line 731. For example, on the basis of the first information associated with the degree of loss of the IF signal, which is predetermined by the physical characteristics of the first transmission line 731, the second amplification circuit 714 may amplify the first and second IF signals so as to have substantially the same magnitude as before the loss occurs. As another example, on the basis of the second information associated with the degree of loss, which occurs while an IF signal is transmitted or received, whenever the IF signal is transmitted or received on the first transmission line 731, the second amplification circuit 714 may amplify the first and second IF signals so as to have substantially the same magnitude as before the loss occurs.

In an embodiment, the second RFIC 620 may include a second communication circuit 702 and a second compensation unit 720. The second communication circuit 702 in the second RFIC 620 may include various circuitry and perform substantially the same function as the first communication circuit 701 in the first RFIC 610.

In an embodiment, the second compensation unit 720 may be connected to the first compensation unit 710. The second compensation unit 720 may transmit and/or receive a second IF signal to and/or from the first compensation unit 710. When a distance between the first RFIC 610 and the second RFIC 620 increases, the loss of the second IF signal may increase on a second transmission line 732 connecting the first RFIC 610 and the second RFIC 620. The second compensation unit 720 may compensate for the loss of the second IF signal delivered from the first RFIC 610 to the second RFIC 620 or from the second RFIC 620 to the first RFIC 610. The first compensation unit 710 may transmit or receive the second IF signal, which is obtained by compensating for the loss, to or from the communication circuit 702 in the second RFIC 620. The second compensation unit 720 may include a third switch circuit 721, a fourth switch circuit 722, a third amplification circuit 723, and a fourth amplification circuit 724.

In an embodiment, the third switch circuit 721 may selectively be connected to the third amplification circuit 723 or the fourth amplification circuit 724 depending on whether the second IF signal is a transmit signal or a receive signal. For example, when the second IF signal is delivered from the first RFIC 610 to the second compensation unit 720, the third switch circuit 721 may be connected to the third amplification circuit 723. As another example, when the second IF signal is delivered from the second compensation unit 720 to the first RFIC 610, the third switch circuit 721 may be connected to the fourth amplification circuit 724.

In an embodiment, the fourth switch circuit 722 may transmit and/or receive the second IF signal to and/or from the communication circuit 702 included in the second RFIC 620. The fourth switch circuit 722 may allow other IF signals other than the second IF signal to bypass the second RFIC 620.

In an embodiment, the third amplification circuit 723 may amplify the second IF signal delivered from the first RFIC 610 to the second compensation unit 720 based on the degree of loss of the IF signal occurring on the second transmission line 732. For example, the second compensation unit 720 may store third information associated with the degree of loss of an IF signal predetermined by the physical characteristics of the second transmission line 732. The second compensation unit 720 may set a gain value of the third amplification circuit 723 based on the third information such that the third amplification circuit 723 amplifies the second IF signal so as to have substantially the same magnitude as before the loss occurs. As another example, whenever an IF signal is transmitted or received on the second transmission line 732, the IFIC 550 may provide the second compensation unit 720 with fourth information associated with the degree of loss occurring while the IF signal is transmitted or received. The second compensation unit 720 may set a gain value of the third amplification circuit 723 based on the fourth information obtained from the IFIC 550 such that the third amplification circuit 723 amplifies the second IF signal so as to have substantially the same magnitude as before the loss occurs. On the basis of the set gain value, the third amplification circuit 723 may amplify the second IF signal so as to have substantially the same magnitude as before the loss occurs.

In an embodiment, the fourth amplification circuit 724 may amplify the second IF signal delivered from the second compensation unit 720 to the first RFIC 610 based on the degree of loss of the IF signal occurring on the second transmission line 732. For example, on the basis of the third information associated with the degree of loss of the IF signal, which is predetermined by the physical characteristics of the second transmission line 732, the fourth amplification circuit 724 may amplify the second IF signal so as to have substantially the same magnitude as before the loss occurs. As another example, on the basis of the fourth information associated with the degree of loss, which occurs while an IF signal is transmitted or received, whenever the IF signal is transmitted or received on the second transmission line 732, the fourth amplification circuit 724 may amplify the second IF signal so as to have substantially the same magnitude as before the loss occurs.

In an embodiment, the loss of the first IF signal occurs on the first transmission line 731, and may be compensated by the first compensation unit 710. The loss of the second IF signal may occur on the first and second transmission lines 731 and 732. The loss of the second IF signal generated on the first transmission line 731 may be compensated by the first compensation unit 710. The loss of the second IF signal generated on the second transmission line 732 may be compensated by the second compensation unit 720. Accordingly, both the losses of the first and second IF signals may be compensated using the first and second compensation units 710 and 720, respectively. The loss of each of the first and second IF signals may be compensated using the first and second compensation units 710 and 720, and thus a length of each of the first and second transmission lines 731 and 732 and/or a placement structure may be designed in various ways.

In an embodiment, FIG. 7 illustrates detailed structures of the first and second RFICs 610 and 620. Detailed structures of the third and fourth RFICs 630 and 640 may be substantially the same as those of the first and second RFICs 610 and 620. As such, all the losses of the first to fourth IF signals may be compensated, and thus the placement structure of the first to fourth RFICs 610, 620, 630, and 640 may be designed in various ways.

Figure 8:
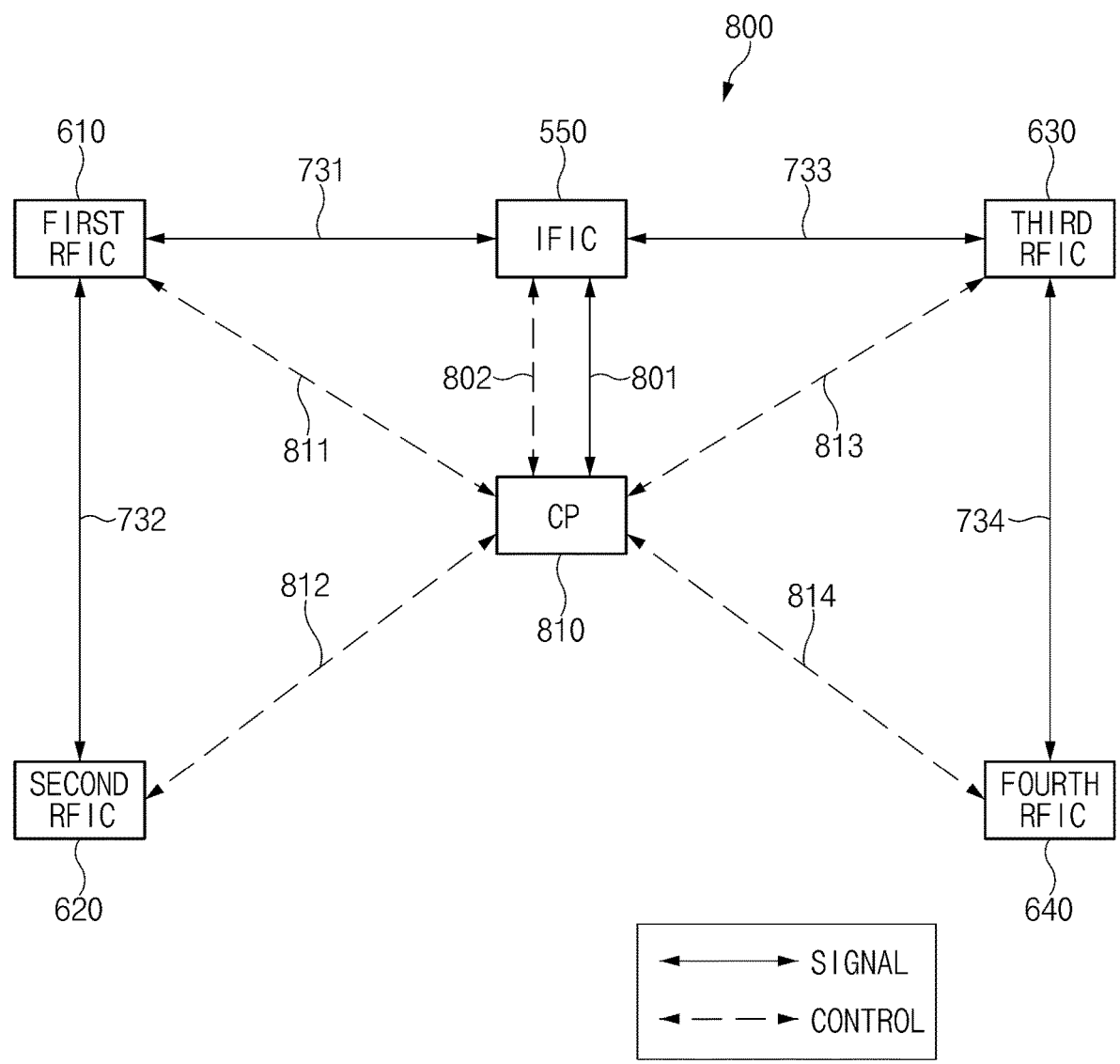
FIG. 8 is a diagram illustrating an IF signal, a digital signal, and a control signal between an IFIC, first to fourth RFICs, and a communication processor, according to various embodiments.

FIG. 8 is a diagram 800 illustrating an IF signal, a digital signal, and a control signal between the IFIC 550, the first to fourth RFICs 610, 620, 630, and 640, and a communication processor (hereinafter referred to as "CP") 810, according to various embodiments.

In an embodiment, the IFIC 550 may be connected to the first RFIC 610 using the first transmission line 731. The IFIC 550 may transmit and/or receive the first and second IF signals to and/or from the first RFIC 610 using the first transmission line 731.

In an embodiment, the IFIC 550 may be connected to the third RFIC 630 using a third transmission line 733. The IFIC 550 may transmit and/or receive third and fourth IF signals to and/or from the third RFIC 630 using the third transmission line 733.

In an embodiment, the first RFIC 610 may be connected to the second RFIC 620 using the second transmission line 732. The first RFIC 610 may transmit and/or receive the second IF signal to and/or from the second RFIC 620 using the second transmission line 732.

In an embodiment, the third RFIC 630 may be connected to the fourth RFIC 640 using a fourth transmission line 734. The third RFIC 630 may transmit and/or receive the fourth IF signal to and/or from the fourth RFIC 640 using the fourth transmission line 734.

In an embodiment, the IFIC 550 may be connected to the CP 810 using an I/Q transmission line 801. The IFIC 550 may modulate first to fourth IF signals into digital signals. The IFIC 550 may transmit and/or receive the digital signals to and/or from the CP 810 using the I/Q transmission line 801.

In an embodiment, the CP 810 may be connected to the first to fourth RFICs 610, 620, 630, and 640 using first to fourth control signal lines 811, 812, 813, and 814, respectively. The CP 810 may provide information necessary for the first to fourth RFICs 610, 620, 630, and 640 to compensate for losses of the first to fourth IF signals using the first to fourth control signal lines 811, 812, 813, and 814, respectively. For example, the CP 810 may provide the first to fourth RFICs 610, 620, 630, and 640 with information about original magnitudes of the first to fourth IF signals thus transmitted and/or received, respectively. The first to fourth RFICs 610, 620, 630, and 640 may transmit and/or receive the first to fourth IF signals, and then may determine how much the first to fourth IF signals are lost, by comparing the magnitude of each of the first to fourth IF signals with original magnitude information of each of the first to fourth IF signals received from the CP 810. As another example, the CP 810 may provide the first to fourth RFICs 610, 620, 630, and 640 with information associated with IF signal loss degrees according to the physical characteristics of the first to fourth transmission lines 731, 732, 733, and 734 or IF signal loss degrees during current communication.

In an embodiment, the CP 810 may be connected to the IFIC 550 using an I/Q control signal line 802. The CP 810 may transmit and/or receive various control signals for controlling the IFIC 550 using the I/Q control signal line 802.

Figure 9A:
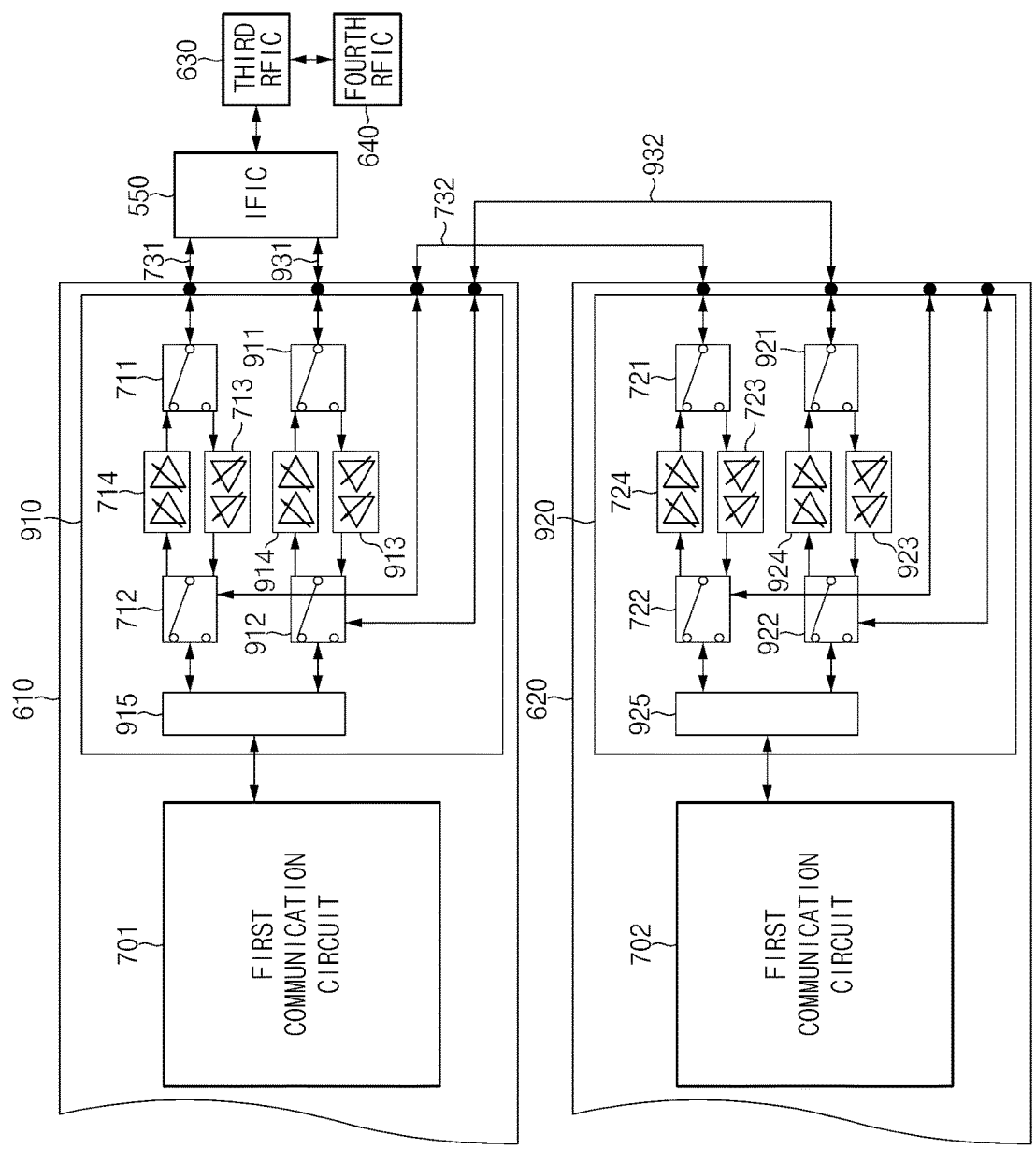
FIG. 9A is a circuit diagram illustrating first and second RFICs in detail, according to various embodiments.

FIG. 9A is a circuit diagram illustrating the first and second RFICs 610 and 620, according to various embodiments. FIG. 9A illustrates that the first and second RFICs 610 and 620 support MIMO.

In an embodiment, as shown in FIG. 9A, each of the first and second RFICs 610 and 620 may receive or output two IF signals. However, the disclosure is not limited thereto. Each of the first to fourth RFICs 610, 620, 630, and 640 may input and output two or more IF signals.

In an embodiment, the first RFIC 610 may include the first communication circuit 701 and a third compensation unit 910. The first communication circuit 701 may be substantially the same as the first communication circuit 701 included in the first RFIC 610 described with reference to FIG. 7.

In an embodiment, the third compensation unit 910 may include the first switch circuit 711, the second switch circuit 712, the first amplification circuit 713, the second amplification circuit 714, a fifth switch circuit 911, a sixth switch circuit 912, a fifth amplification circuit 913, a sixth amplification circuit 914, and a first logic element 915. The first switch circuit 711, the second switch circuit 712, the first amplification circuit 713, and the second amplification circuit 714 are substantially the same as the first switch circuit 711, the second switch circuit 712, the first amplification circuit 713, and the second amplification circuit 714 described in conjunction with FIG. 7. Accordingly, additional description will be hereinafter omitted to avoid redundancy.

In an embodiment, the fifth switch circuit 911 may be selectively connected to the fifth amplification circuit 913 or the sixth amplification circuit 914 depending on whether an IF signal associated with the first and second RFICs 610 and 620 is a transmit signal or a receive signal. The sixth switch circuit 912 may allow the first communication circuit 701 included in the first RFIC 610 to transmit and/or receive an IF signal associated with the first RFIC 610. The sixth switch circuit 912 may allow the IF signal associated with the second RFIC 620 to bypass the first RFIC 610 and may allow the second RFIC 620 to transmit and/or receive the IF signal.

In an embodiment, the fifth amplification circuit 913 may amplify the IF signal, which is delivered from the IFIC 550 to the third compensation unit 910, based on the degree of loss of an IF signal occurring on a fifth transmission line 931. The sixth amplification circuit 914 may amplify an IF signal, which is delivered from the third compensation unit 910 to the IFIC 550, based on the degree of loss of an IF signal occurring on a sixth transmission line 932.

In an embodiment, the first logic element 915 may be connected to the second switch circuit 712, the sixth switch circuit 912, and the first communication circuit 701. The first logic element 915 may selectively connect the first communication circuit 701 to the second switch circuit 712 and/or the sixth switch circuit 912. The first logic element 915 may deliver, to the first communication circuit 701, a signal input/output to/from the second switch circuit 712 and/or the sixth switch circuit 912. The first logic element 915 may be implemented as a multiplexer (MUX).

In an embodiment, the second RFIC 620 may include the second communication circuit 702 and a fourth compensation unit 920. The second communication circuit 702 in the second RFIC 620 may perform substantially the same function as the first communication circuit 701 in the first RFIC 610.

In an embodiment, the fourth compensation unit 920 may include the third switch circuit 721, the fourth switch circuit 722, the third amplification circuit 723, the fourth amplification circuit 724, a seventh switch circuit 921, an eighth switch circuit 922, a seventh amplification circuit 923, an eighth amplification circuit 924, and a second logic element 925. The third switch circuit 721, the fourth switch circuit 722, the third amplification circuit 723, and the fourth amplification circuit 724 are substantially the same as the third switch circuit 721, the fourth switch circuit 722, the third amplification circuit 723, and the fourth amplification circuit 724 described in conjunction with FIG. 7. Accordingly, additional description will be hereinafter omitted to avoid redundancy.

In an embodiment, the seventh switch circuit 921 may be selectively connected to the seventh amplification circuit 923 or the eighth amplification circuit 924 depending on whether an IF signal associated with the second RFIC 620 is a transmit signal or a receive signal. The eighth switch circuit 922 may allow the communication circuit 702 included in the second RFIC 620 to transmit and/or receive an IF signal associated with the second RFIC 620. The eighth switch circuit 922 may allow an IF signal independent of the second RFIC 620 to bypass the second RFIC 620.

In an embodiment, the seventh amplification circuit 923 may amplify an IF signal delivered from the first RFIC 610 to the fourth compensation unit 920 based on the degree of loss of the IF signal occurring on the sixth transmission line 932. The eighth amplification circuit 924 may amplify an IF signal, which is delivered from the fourth compensation unit 920 to the first RFIC 610, based on the degree of loss of an IF signal occurring on the sixth transmission line 932.

In an embodiment, the second logic element 925 may be connected to the fourth switch circuit 722, the eighth switch circuit 922, and the second communication circuit 702. The second logic element 925 may selectively connect the second communication circuit 702 to the fourth switch circuit 722 and/or the eighth switch circuit 922. The second logic element 925 may deliver, to the second communication circuit 702, a signal input/output to/from the fourth switch circuit 722 and/or the eighth switch circuit 922. The second logic element 925 may be implemented as a multiplexer (MUX).

Figure 9B:
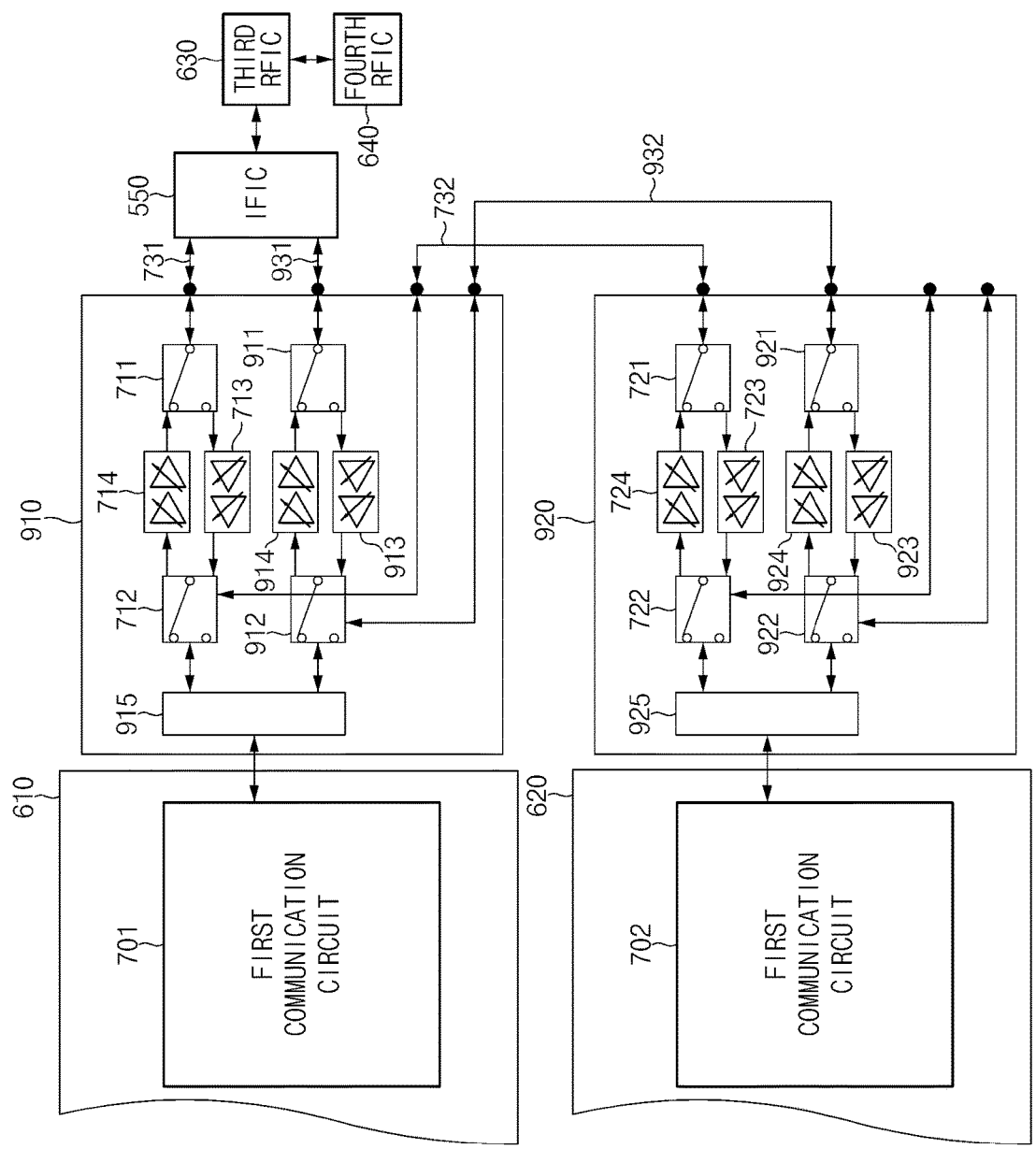
FIG. 9B is a circuit diagram illustrating first and second RFICs and third and fourth compensation units, according to various embodiments.

FIG. 9B is a circuit diagram illustrating the first and second RFICs 610 and 620 and the third and fourth compensation units 910 and 920, according to various embodiments. FIG. 9B illustrates that the first and second RFICs 610 and 620 support MIMO. FIG. 9B is substantially the same as FIG. 9A except that the third and fourth compensation units 910 and 920 are respectively positioned outside the first and second RFICs 610 and 620. Accordingly, redundant description may not be repeated here.

In an embodiment, the third and fourth compensation units 910 and 920 may be positioned separately from the first and second RFICs 610 and 620, respectively. The third and fourth compensation units 910 and 920 may be positioned adjacent to an input terminal, through which the first and second RFICs 610 and 620 receive an IF signal, and/or an output terminal through which the first and second RFICs 610 and 620 output an IF signal. The third compensation unit 910 may compensate for a loss occurring while IF signals input/output to/from the first and second RFICs 610 and 620 are exchanged between the IFIC 550 and the first RFIC 610. The fourth compensation unit 920 may compensate for the loss occurring while IF signals input/output to/from the second RFIC 620 are exchanged between the first RFIC 610 and the second RFIC 620.

Figure 10:
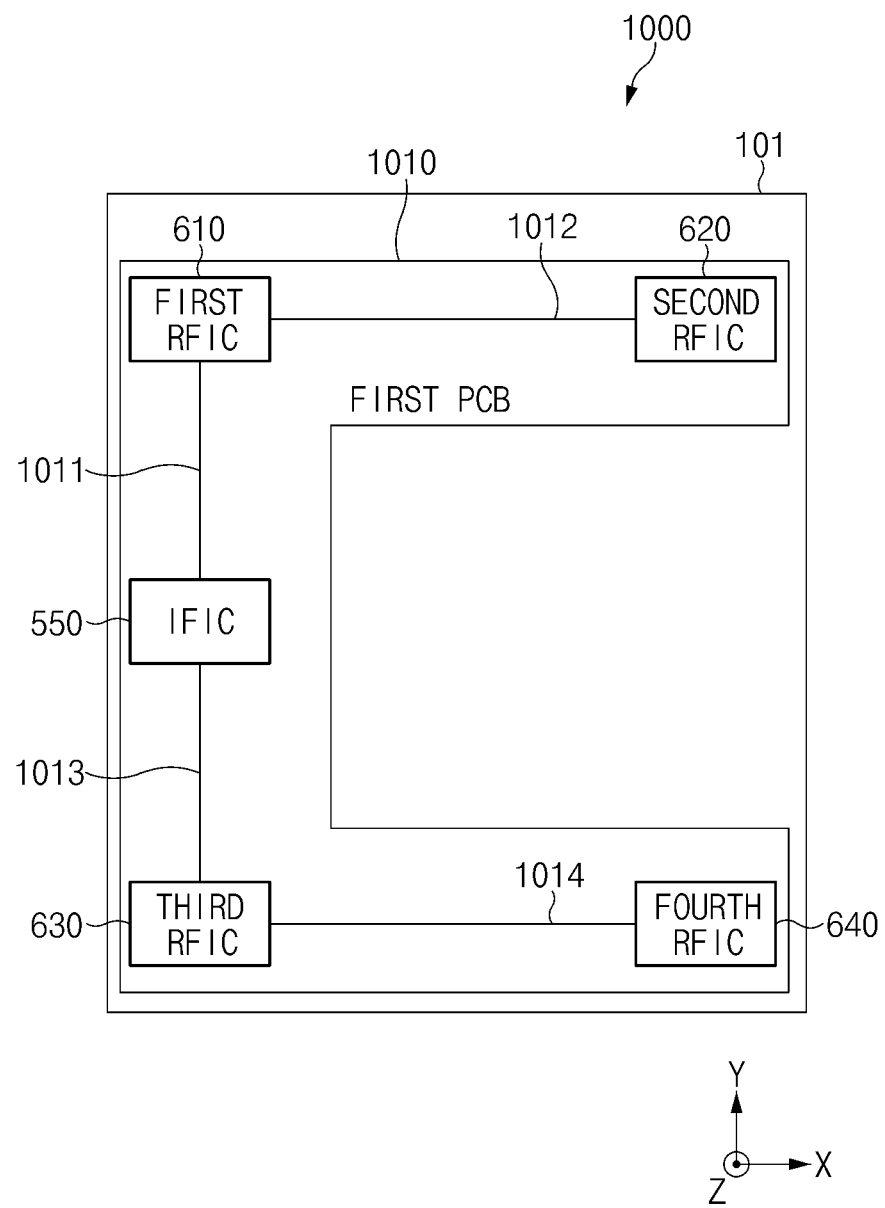
FIG. 10 is a diagram illustrating an electronic device, according to various embodiments.

FIG. 10 is a diagram 1000 illustrating the electronic device 101, according to various embodiments. An electronic device according to an embodiment may include the IFIC 550, the first to fourth RFICs 610, 620, 630, and 640, and a first PCB 1010.

In an embodiment, as shown in FIG. 10, all of the IFIC 550 and the first to fourth RFICs 610, 620, 630, and 640 may be mounted on the first PCB 1010. When all of the IFIC 550 and the first to fourth RFICs 610, 620, 630, and 640 are mounted on the first PCB 1010, the IFIC 550 may be connected to the first and third RFICs 610 and 630 through first and third wires 1011 and 1013 on the first PCB 1010, respectively. Furthermore, the IFIC 550 may be connected to the second and fourth RFICs 620 and 640 via the first and third RFICs 610 and 630 using second and fourth wires 1012 and 1014 on the first PCB 1010, respectively. Accordingly, when transmission lines (e.g., the first to fourth transmission lines 731, 732, 733, and 734 of FIG. 8) for connecting between the IFIC 550 and the first to fourth RFICs 610, 620, 630, and 640 are implemented, wires such as separate coaxial cables may not be laid out. Accordingly, material cost may be reduced as compared to a case that separate wires are laid out.

FIG. 10 illustrates that all of the IFIC 550 and the first to fourth RFICs 610, 620, 630, and 640 are mounted on the first PCB 1010. However, the disclosure is not limited thereto. The IFIC 550 and at least some of the first to fourth RFICs 610, 620, 630, and 640 may be mounted on the first PCB 1010. When the IFIC 550 and at least some of the first to fourth RFICs 610, 620, 630, and 640 may be mounted on the first PCB 1010, the remaining RFICs not mounted on the first PCB 1010 may be positioned adjacent to the first PCB 1010. For example, when the IFIC 550 and first and third RFICs 610 and 630 are mounted on the first PCB 1010, the second and fourth RFICs 620 and 640 may be positioned adjacent to or in contact with the first PCB 1010.

Figure 11:
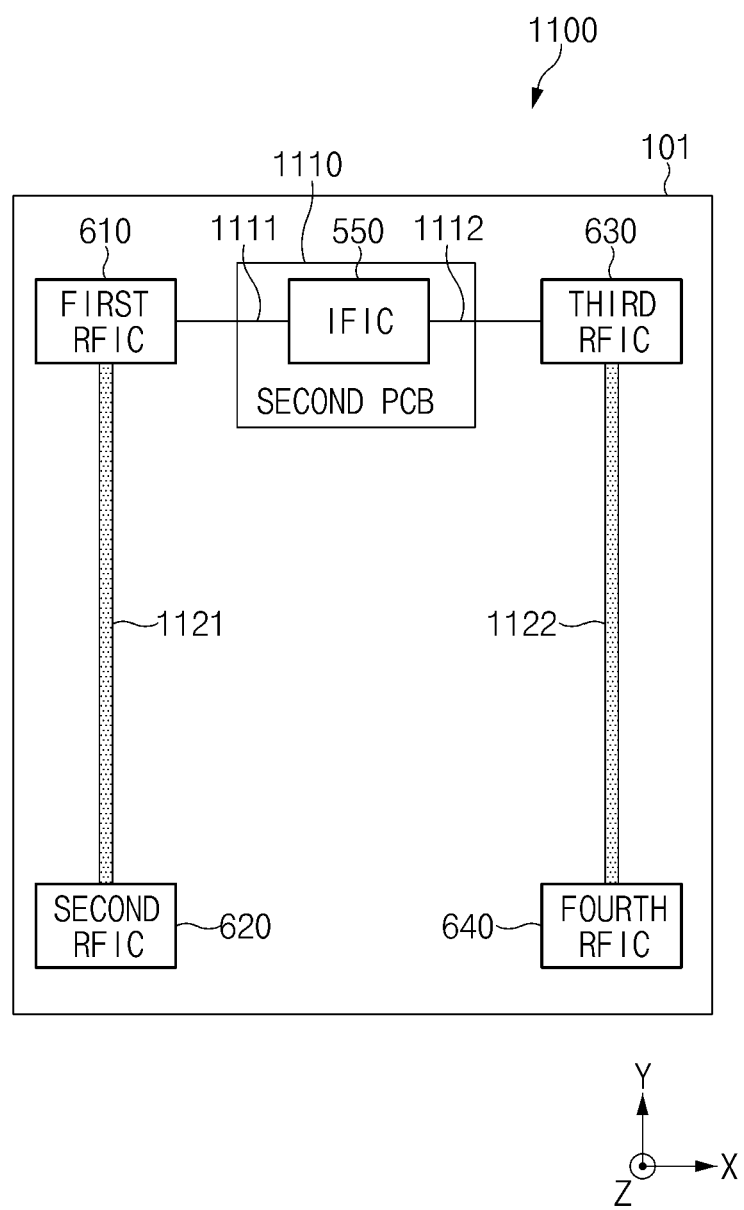
FIG. 11 is a diagram illustrating an electronic device, according to various embodiments.

FIG. 11 is a diagram 1100 illustrating the electronic device 101, according to various embodiments. An electronic device according to an embodiment may include the IFIC 550, the first to fourth RFICs 610, 620, 630, and 640, and a second PCB 1110.

In an embodiment, the IFIC 550 may be mounted on the second PCB 1110. The first to fourth RFICs 610, 620, 630, and 640 may be positioned in an area other than an area where the second PCB 1110 is positioned. Some of the first to fourth RFICs 610, 620, 630, and 640 may be positioned adjacent to the second PCB 1110, and the remaining RFICs may be positioned on a location farther from the second PCB 1110 than some of the RFICs. For example, the first and third RFICs 610 and 630 may be positioned adjacent to the second PCB 1110. The second and fourth RFICs 620 and 640 may be positioned at locations farther from the second PCB 1110 than the first and third RFICs 610 and 630.

In an embodiment, the first and third RFICs 610 and 630 may be directly connected to the IFIC 550. The second and fourth RFICs 620 and 640 may be connected to the first and third RFICs 610 and 630, respectively. The first and third RFICs 610 and 630 may be connected to the IFIC 550 using first and second IFIC-RFIC transmission lines 1111 and 1112. The second and fourth RFICs 620 and 640 may be connected to the first and third RFICs 610 and 630 using first and second RFIC-RFIC transmission lines 1121 and 1122, respectively. For example, the second and fourth RFICs 620 and 640 may be connected to the first and third RFICs 610 and 630 through coaxial cables, respectively.

In an embodiment, the first to fourth RFICs 610, 620, 630, and 640 may have compensation units (e.g., the first and second compensation units 710 and 720 of FIG. 7). Accordingly, even though the loss of an IF signal occurs on the first and second IFIC-RFIC transmission lines 1111 and 1112 and/or the first and second RFIC-RFIC transmission lines 1121 and 1122, the IF signal may be converted into an RF signal after compensation as much as the occurring loss. Afterward, the RF signal may be transmitted, or a digital signal may be received. Accordingly, the IFIC 550 and the first to fourth RFICs 610, 620, 630, and 640 may be freely laid out, and thus the electronic device may be designed more freely.

Figure 12:
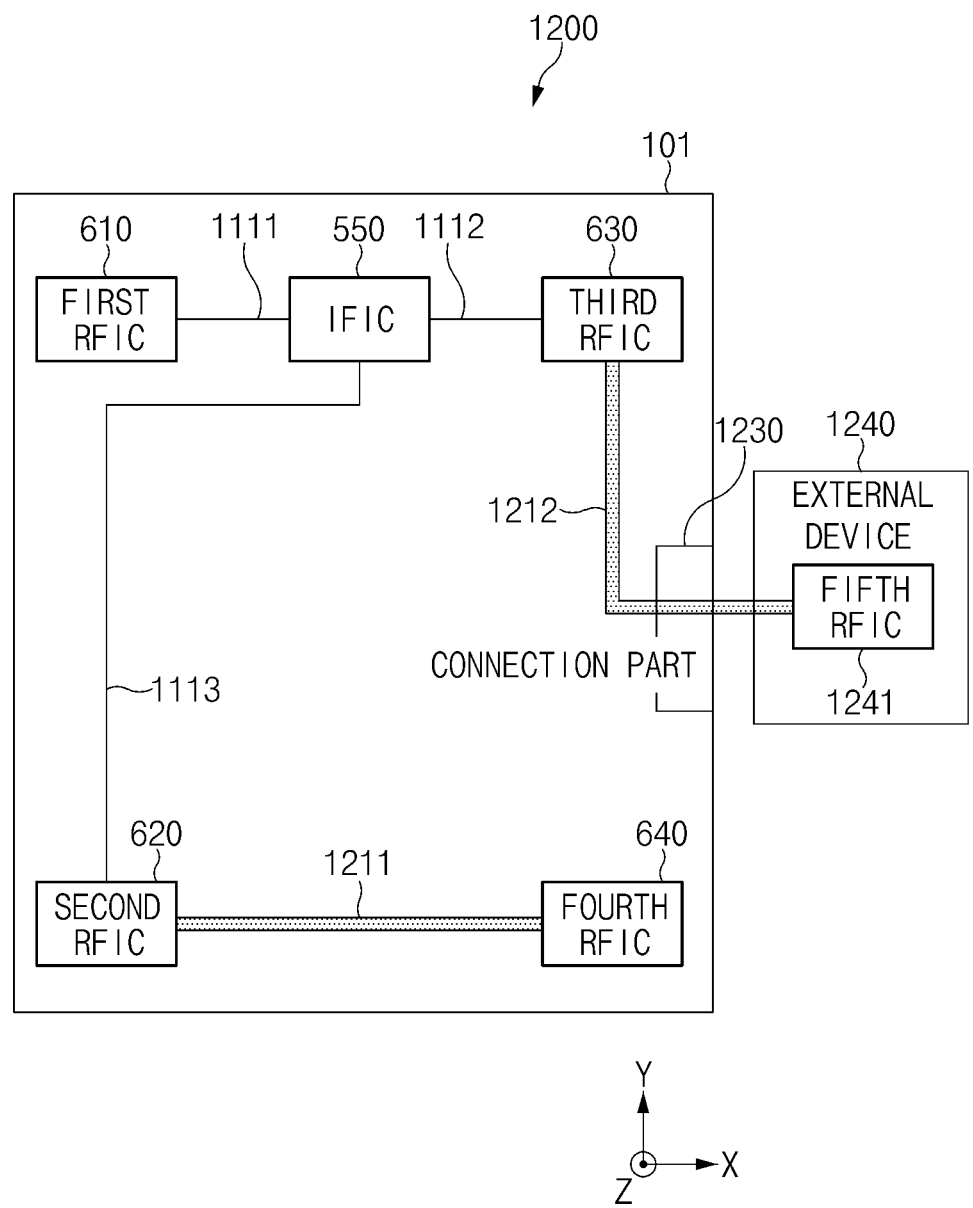
FIG. 12 is a diagram illustrating an electronic device and an external device, according to various embodiments.
Figure 13:
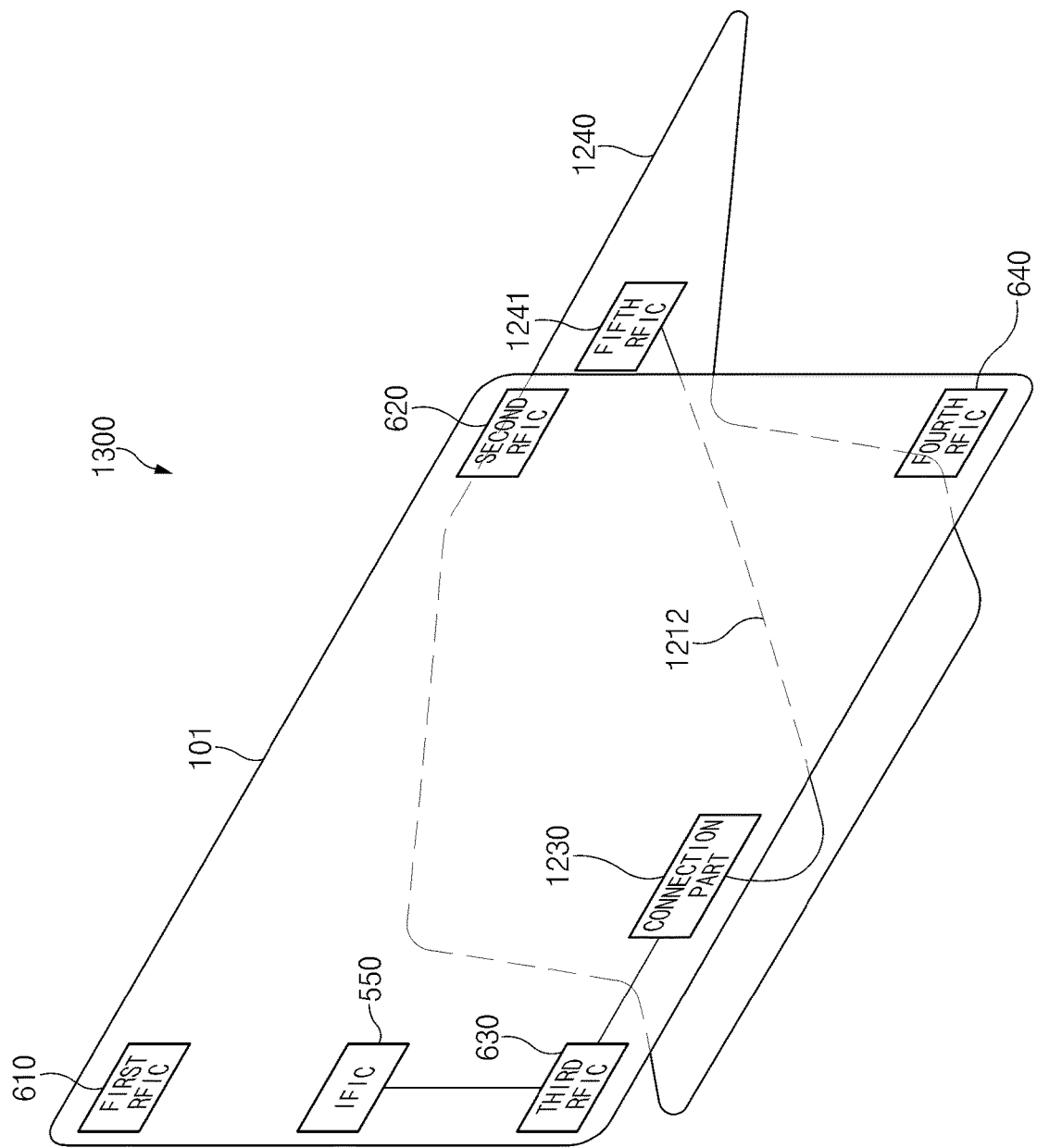
FIG. 13 is a perspective view illustrating an electronic device and an external device, according to various embodiments.

FIG. 12 is a diagram 1200 illustrating the electronic device 101 and an external device 1240, according to various embodiments. FIG. 13 is a perspective view 1300 illustrating the electronic device 101 and the external device 1240, according to various embodiments.

In an embodiment, the electronic device 101 may include the IFIC 550 and the first to fourth RFICs 610, 620, 630, and 640. The first to third RFICs 610, 620, and 630 may be directly connected to the IFIC 550 through first to third IFIC-RFIC transmission lines 1111, 1112, and 1113, respectively. The fourth RFIC 640 may be connected to the second RFIC 620 using a third RFIC-RFIC transmission line 1211.

In an embodiment, the electronic device 101 may be connected to the external device 1240 using a connection part 1230. The external device 1240 may be an accessory device capable of being used in connection with the electronic device 101, such as a dock having a terminal, a book cover, and/or a keyboard.

In an embodiment, the external device 1240 may include a fifth RFIC 1241. The external device 1240 may transmit and/or receive an RF signal using the fifth RFIC 1241. Accordingly, the RF signal may be transmitted and/or received even on a surface where the external device 1240 is positioned.

In an embodiment, the RFIC 1241 provided in the external device 1240 may be connected to at least one RFIC 630 among the RFICs 610, 620, 630, and 640 included in the electronic device 101 using the RFIC-RFIC transmission line 1212. For example, as shown in FIG. 12, the fifth RFIC 1241 may be connected to the third RFIC 630 using a fourth RFIC-RFIC transmission line 1212.

Figure 14:
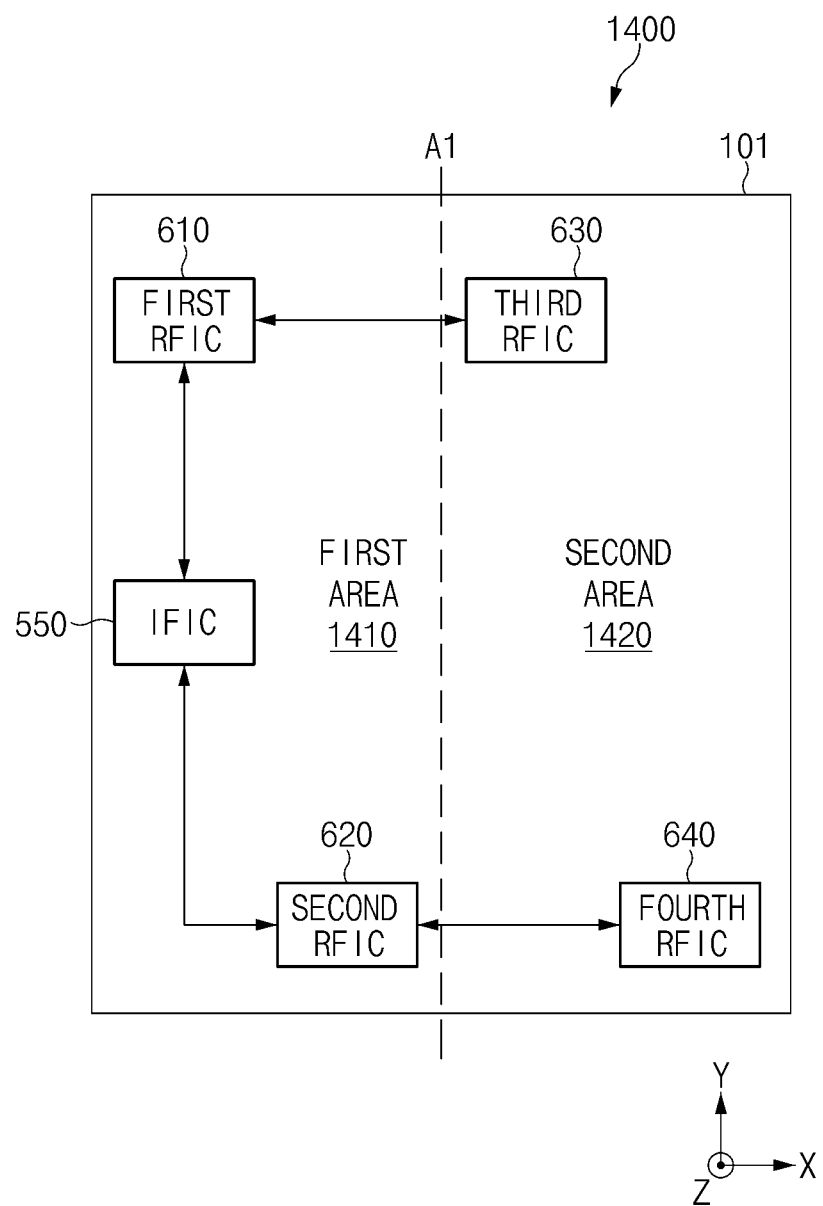
FIG. 14 is a diagram illustrating an IFIC and first to fourth RFICs when an electronic device is unfolded, according to various embodiments.
Figure 15:
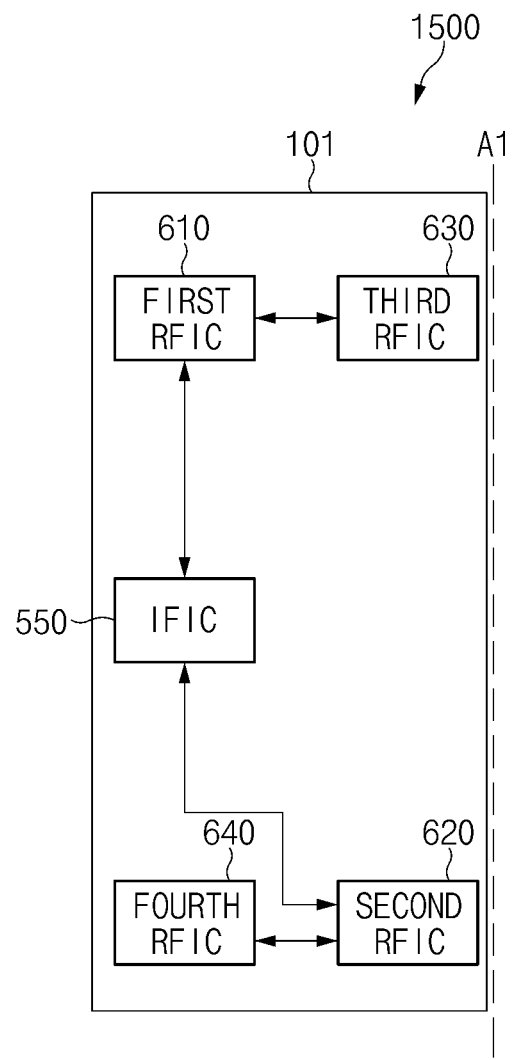
FIG. 15 is a diagram illustrating an IFIC and first to fourth RFICs when an electronic device is folded, according to various embodiments.
Figure 16:
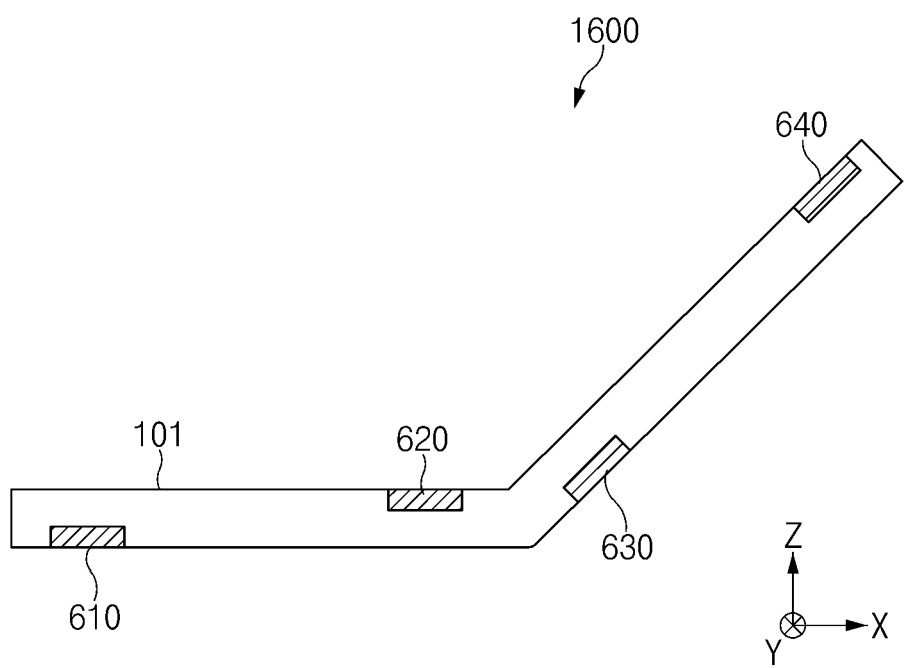
FIG. 16 is a cross-sectional view illustrating an IFIC and first to fourth RFICs when an electronic device is unfolded, according to various embodiments.
Figure 17:
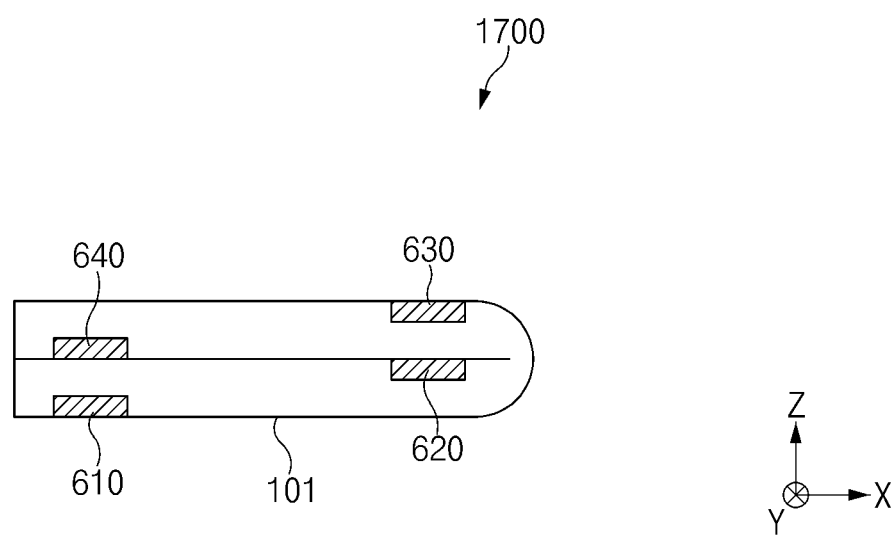
FIG. 17 is a cross-sectional view illustrating an IFIC and first to fourth RFICs when an electronic device is folded, according to various embodiments.

FIG. 14 is a diagram 1400 illustrating the IFIC 550 and the first to fourth RFICs 610, 620, 630, and 640 when the electronic device 101 is unfolded, according to various embodiments. FIG. 15 is a diagram 1500 illustrating the IFIC 550 and the first to fourth RFICs 610, 620, 630, and 640 when the electronic device 101 is folded, according to various embodiments. FIG. 16 is a cross-sectional view 1600 illustrating the IFIC 550 and the first to fourth RFICs 610, 620, 630, and 640 when the electronic device 101 is unfolded, according to various embodiments. FIG. 17 is a cross-sectional view 1700 illustrating the IFIC 550 and the first to fourth RFICs 610, 620, 630, and 640 when the electronic device 101 is folded, according to various embodiments. In FIGS. 14, 15, 16 and 17, it is assumed that the electronic device 101 is a foldable electronic device. The foldable electronic device may have an in-folding, out-folding, and/or multi-folding method depending on a method in which a display is folded. The in-folding method may be a method in which the display is folded inwardly. The out-folding method may be a method in which the display is folded while being exposed to the outside. The multi-folding method may be a method in which the display is folded more than two times by having at least two folding lines.

In an embodiment, the electronic device 101 may be folded or unfolded in a first direction (X-axis). The electronic device 101 may have a first folding line A1. The first folding line A1 may be provided to cross the electronic device 101 in a second direction (Y-axis) perpendicular to the first direction (X-axis). The electronic device 101 may be folded or unfolded with respect to the first folding line A1. The electronic device 101 may include a first area 1410 and a second area 1420, which are separated with respect to the first folding line A1.

In an embodiment, the IFIC 550 and the first to fourth RFICs 610, 620, 630, and 640 may be arranged not to overlap the first folding line A1. The IFIC 550 may be positioned spaced from the first folding line A1. The IFIC 550 may be positioned adjacent to an edge of the electronic device 101 formed parallel to the first folding line A1. For example, the IFIC 550 may be positioned adjacent to an edge, which is formed parallel to the Y-axis, from among edges of the electronic device 101.

In an embodiment, the first and second RFICs 610 and 620 may be diagonally arranged at vertices of the first area 1410 in the first area 1410 with respect to the first direction (X-axis) and the second direction (Y-axis). The third and fourth RFICs 630 and 640 may be diagonally arranged at vertices of the second area 1420 in the second area 1420 with respect to the first direction (X-axis) and the second direction (Y-axis).

In an embodiment, the first to fourth RFICs 610, 620, 630, and 640 may be arranged adjacent to edges of the electronic device 101 with respect to the first direction (X-axis) and the second direction (Y-axis). For example, the first to fourth RFICs 610, 620, 630, and 640 may be positioned at vertices of the electronic device 101 when the electronic device 101 is folded with respect to the first folding line A1. Accordingly, when the electronic device 101 is used while being folded, the radiation efficiency of RF signals by the first to fourth RFICs 610, 620, 630, and 640 may increase.

In an embodiment, the first and second RFICs 610 and 620 may be directly connected to the IFIC 550. The third and fourth RFICs 630 and 640 may be connected to the first and second RFICs 610 and 620, respectively. When the electronic device 101 is unfolded or folded, the electronic device 101 may maintain a state where the first and second RFICs 610 and 620 are connected to the IFIC 550, and the third and fourth RFICs 630 and 640 are respectively connected to the first and second RFICs 610 and 620.

According to various example embodiments, an electronic device (e.g., the electronic device 101 of FIG. 1) may include: a plurality of radio frequency integrated circuits (RFICs) (e.g., the first to fourth RFICs 610, 620, 630, and 640 of FIG. 6), configured to deliver a digital signal, to be transmitted by a modem (e.g., the modem 570 of FIG. 5) through an antenna (e.g., the antenna element 330 of FIG. 3A) configured to transmit and/or receive a radio frequency (RF) signal, and to deliver the RF signal received from the antenna, in a direction of the modem, the plurality of RFICs being at least partially connected to one another, an inter frequency integrated circuit (IFIC) (e.g., the IFIC 550 of FIG. 6) connected to at least one RFIC (e.g., the first and third RFICs 610 and 630 of FIG. 6) among the plurality of RFICs (610, 620, 630, 640) and configured to receive the digital signal from the modem, to convert the digital signal to an inter frequency (IF) signal, to deliver the IF signal to the RFIC, to convert the RF signal delivered from the RFIC, to the IF signal, and to deliver the IF signal to the modem, and a plurality of compensation units (e.g., the first and second compensation units 710 and 720) comprising circuitry respectively connected to the plurality of RFICs or respectively positioned inside of the plurality of RFICs and configured to compensate for a loss of the IF signal occurring between the IFIC and the at least one RFIC or to compensate for a loss of the IF signal occurring between the plurality of RFICs.

In an example embodiment, the plurality of RFICs may include a first RFIC connected to the IFIC and a second RFIC connected to the first RFIC. The first RFIC may receive a first IF signal and a second IF signal from the IFIC or may deliver the first IF signal and the second IF signal. The second RFIC may receive the second IF signal via the first RFIC and may deliver the second IF signal to the first RFIC via the first RFIC.

In an example embodiment, the plurality of compensation units may include a first compensation unit positioned inside the first RFIC and a second compensation unit positioned inside the second RFIC.

In an example embodiment, the first compensation unit may include a first switch circuit configured to selectively connect to a first amplification circuit (e.g., the first amplification circuit 713 of FIG. 7) or a second amplification circuit (e.g., the second amplification circuit 714 of FIG. 7) depending on whether a first IF signal transmitted and/or received by the first RFIC, and a second IF signal transmitted and/or received by the second RFIC, are transmit signals or receive signals, and a second switch circuit (e.g., the second switch circuit 712 of FIG. 7) configured to allow a first communication circuit (e.g., the first communication circuit 701 of FIG. 7) included in the first RFIC to transmit and/or receive the first IF signal or to allow the second IF signal to bypass the first RFIC and to allow the second RFIC to transmit and/or receive the second IF signal.

In an example embodiment, the first amplification circuit may be configured to amplify the first IF signal and the second IF signal, delivered from the IFIC to the first compensation unit, based on a loss degree of an IF signal occurring on a first transmission line (e.g., the first transmission line 731 of FIG. 7) connecting the IFIC and the first RFIC. The second amplification circuit may be configured to amplify the first IF signal and the second IF signal, which are delivered from the first compensation unit to the IFIC, based on a loss degree of an IF signal occurring on the first transmission line.

In an example embodiment, the first compensation unit may be configured to store first information associated with a loss degree of an IF signal predetermined by a physical characteristic of the first transmission line and to set a gain value of at least one of the first amplification circuit and the second amplification circuit based on the first information such that the first amplification circuit is configured to amplify the first IF signal and the second IF signal to have substantially the same magnitude as before a loss occurs.

In an example embodiment, the IFIC may be configured to provide the first compensation unit with second information associated with a loss degree occurring whenever an IF signal is exchanged on the first transmission line. The first compensation unit may be configured to set a gain value of at least one of the first amplification circuit and the second amplification circuit based on the second information such that the first amplification circuit is configured to amplify the first IF signal and the second IF signal to have substantially the same magnitude as before a loss occurs.

In an example embodiment, the plurality of compensation units (e.g., the third and fourth compensation units 910 and 920 of FIG. 9A) may include a third compensation unit interposed between the IFIC and the first RFIC and a fourth compensation unit interposed between the first RFIC and the second RFIC. The third compensation unit may include a fifth switch circuit configured to selectively connect to a fifth amplification circuit (e.g., the fifth amplification circuit 913 of FIG. 9A) or a sixth amplification circuit (e.g., the sixth amplification circuit 914 of FIG. 9A) depending on whether an IF signal associated with the first RFIC and the second RFIC is a transmit signal or a receive signal and a sixth switch circuit configured to allow a first communication circuit included in the first RFIC to transmit and/or receive an IF signal associated with the first RFIC or to allow an IF signal associated with the second RFIC to bypass the first RFIC and to allow the second RFIC to transmit and/or receive the IF signal associated with the second RFIC.

In an example embodiment, the fifth amplification circuit may be configured to amplify an IF signal delivered from the IFIC to the third compensation unit, based on a loss degree of an IF signal occurring on a fifth transmission line connecting the IFIC and the third compensation unit.

According to various example embodiments, the electronic device may include: a communication processor (CP) (e.g., the CP 810 of FIG. 8), an IFIC connected to the CP using an in-phase/quadrature (I/Q) transmission line (e.g., the I/Q transmission line 801 of FIG. 8) and an I/Q control signal line (e.g., the I/Q control signal line 802 of FIG. 8), a first RFIC connected to the IFIC using a first transmission line, and a second RFIC connected to the first RFIC using a second transmission line (e.g., the second transmission line 732 of FIG. 8). The first RFIC may include a first compensation unit comprising circuitry configured to compensate for a loss of an IF signal occurring on the first transmission line. The second RFIC may include a second compensation unit comprising circuitry configured to compensate for the loss of the IF signal on the second transmission line.

In an example embodiment, the IFIC may be configured to transmit and/or receive a first IF signal and a second IF signal with the first RFIC using the first transmission line. The first RFIC may be configured to transmit and/or receive a second IF signal with the second RFIC using the second transmission line.

In an example embodiment, the CP may be connected to the first RFIC and the second RFIC using first and second control signal lines (e.g., the first and second control signal lines 811 and 812 of FIG. 8). The CP may be configured to provide the first RFIC and the second RFIC with information necessary to compensate for a loss of each of the first IF signal and the second IF signal.

In an example embodiment, the IFIC, the first RFIC, and the second RFIC may be mounted on a first PCB (e.g., the first PCB 1010 of FIG. 10). The IFIC and the first RFIC, and the second RFIC may be connected by wires (e.g., the first to fourth wires 1011, 1012, 1013, and 1014 of FIG. 10) on the first PCB.

In an example embodiment, the IFIC may be mounted on a second PCB (e.g., the second PCB 1110 of FIG. 11). The first RFIC may be positioned adjacent to the second PCB. The second RFIC may be positioned farther from the second PCB than the first RFIC. The first RFIC may be connected to the IFIC using an IFIC-RFIC transmission line (e.g., the first IFIC-RFIC transmission line 1111 of FIG. 11). The second RFIC may be connected to the first RFIC using an RFIC-RFIC transmission line (e.g., the first RFIC-RFIC transmission line 1121 of FIG. 11).

In an example embodiment, the electronic device may further include a connector (e.g., the connection part 1230 of FIG. 12) connected to an external device (e.g., the external device 1240 of FIG. 12) that is an accessory capable of being used in connection to the electronic device 101. At least one RFIC among the first RFIC and the second RFIC may be connected to an RFIC (e.g., the fifth RFIC 1241 of FIG. 12) provided in the external device using an RFIC-RFIC transmission line (e.g., the fourth RFIC-RFIC transmission line 1212 of FIG. 12).

According to various example embodiments, an electronic device (e.g., the electronic device 101 of FIG. 14) capable of being folded or unfolded in a first direction (e.g., X-axis direction) may include: an IFIC positioned to not overlap a first folding line provided to cross the electronic device in a second direction (e.g., Y-axis direction) perpendicular to the first direction (X-axis), and first, second, third and fourth RFICs positioned to not overlap the first folding line. Each of the first, second, third and fourth RFICs may include a compensation units comprising circuitry configured to compensate for a loss of an IF signal occurring between the IFIC and the first, second, third and fourth RFICs. The first and second RFICs may be diagonally arranged at vertices of a first area in the first area, which is divided based on the first folding line, with respect to the first direction and the second direction. The third and fourth RFICs may be diagonally arranged at vertices of a second area (e.g., the second area 1420 of FIG. 14) in the second area, which is divided based on the first folding line, with respect to the first direction and the second direction. The first, second, third and fourth RFICs may be positioned adjacent to an edge of the electronic device with respect to the first direction and the second direction.

In an example embodiment, the IFIC may be positioned adjacent to an edge of the electronic device, which is space from the first folding line and which is formed parallel to the first folding line.

In an example embodiment, the first, second, third and fourth RFICs may be positioned at vertices of the electronic device when the electronic device is folded with respect to the first folding line.

In an example embodiment, the first and second RFICs may be directly connected to the IFIC. The third and fourth RFICs may be connected to the first and second RFICs, respectively.

In an example embodiment, when the electronic device is unfolded or folded, the electronic device may maintain a state where the first and second RFICs are connected to the IFIC, and the third and fourth RFICs are respectively connected to the first and second RFICs.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. An electronic device comprising:
   a plurality of radio frequency integrated circuits (RFICs) configured to deliver a digital signal to be transmitted by a modem through an antenna configured to transmit and/or receive a radio frequency (RF) signal, in a form of the RF signal and to deliver the RF signal, received from the antenna, in a direction of the modem, wherein the plurality of RFICs are at least partially connected to one another;
   an inter frequency integrated circuit (IFIC) connected to at least one RFIC among the plurality of RFICs and configured to receive the digital signal from the modem, to convert the digital signal to an inter frequency (IF) signal, to deliver the IF signal to the RFIC, to convert the RF signal delivered from the RFIC to the IF signal, and to deliver the IF signal to the modem; and
   a plurality of compensation units respectively connected to the plurality of RFICs or respectively positioned inside of the plurality of RFICs, the compensations units comprising circuitry configured to compensate for a loss of the IF signal occurring between the IFIC and the at least one RFIC or to compensate for a loss of the IF signal occurring between the plurality of RFICs.

2. The electronic device of claim 1, wherein the plurality of RFICs includes:
   a first RFIC connected to the IFIC; and
   a second RFIC connected to the first RFIC,
   wherein the first RFIC is configured to receive a first IF signal and a second IF signal from the IFIC or to deliver the first IF signal and the second IF signal, and
   wherein the second RFIC is configured to receive the second IF signal via the first RFIC and to deliver the second IF signal to the first RFIC via the first RFIC.

3. The electronic device of claim 2, wherein the plurality of compensation units includes:
   a first compensation unit positioned inside the first RFIC; and
   a second compensation unit positioned inside the second RFIC.

4. The electronic device of claim 3, wherein the first compensation unit includes:
   a first switch circuit configured to selectively connect to a first amplification circuit or a second amplification circuit depending on whether the first IF signal transmitted and/or received by the first RFIC, and the second IF signal transmitted and/or received by the second RFIC, are transmit signals or receive signals; and
   a second switch circuit configured to allow a first communication circuit included in the first RFIC to transmit and/or receive the first IF signal or to allow the second IF signal to bypass the first RFIC and to allow the second RFIC to transmit and/or receive the second IF signal.

5. The electronic device of claim 4, wherein the first amplification circuit is configured to amplify the first IF signal and the second IF signal delivered from the IFIC to the first compensation unit based on a loss degree of an IF signal occurring on a first transmission line connecting the IFIC and the first RFIC, and
   wherein the second amplification circuit is configured to amplify the first IF signal and the second IF signal delivered from the first compensation unit to the IFIC based on a loss degree of an IF signal occurring on the first transmission line.

6. The electronic device of claim 5, wherein the first compensation unit is configured to store first information associated with a loss degree of an IF signal predetermined by a physical characteristic of the first transmission line, and to set a gain value of at least one of the first amplification circuit or the second amplification circuit based on the first information such that the first amplification circuit amplifies the first IF signal and the second IF signal to have substantially a same magnitude as before a loss occurs.

7. The electronic device of claim 5, wherein the IFIC is configured to provide the first compensation unit with first information associated with a loss degree occurring based on an IF signal being exchanged on the first transmission line, and
wherein the first compensation unit is configured to set a gain value of at least one of the first amplification circuit and the second amplification circuit based on the first information such that the first amplification circuit amplifies the first IF signal and the second IF signal to have substantially a same magnitude as before a loss occurs.

8. The electronic device of claim 2, wherein the plurality of compensation units includes:
a third compensation unit interposed between the IFIC and the first RFIC; and
a fourth compensation unit interposed between the first RFIC and the second RFIC,
wherein the third compensation unit includes:
a first switch circuit configured to selectively connect to a first amplification circuit or a second amplification circuit depending on whether an IF signal associated with the first RFIC and the second RFIC is a transmit signal or a receive signal; and
a second switch circuit configured to allow a first communication circuit included in the first RFIC to transmit and/or receive an IF signal associated with the first RFIC or to allow an IF signal associated with the second RFIC to bypass the first RFIC and to allow the second RFIC to transmit and/or receive the IF signal associated with the second RFIC.

9. The electronic device of claim 8, wherein the first amplification circuit is configured to amplify an IF signal delivered from the IFIC to the third compensation unit based on a loss degree of an IF signal occurring on a transmission line connecting the IFIC and the third compensation unit.

10. An electronic device comprising:
a communication processor (CP);
an inter frequency integrated circuit (IFIC) connected to the CP using an in-phase/quadrature (I/Q) transmission line and an I/Q control signal line;
a first RFIC connected to the IFIC using a first transmission line; and
a second RFIC connected to the first RFIC using a second transmission line,
wherein the first RFIC includes a first compensation unit comprising circuitry configured to compensate for a loss of an IF signal occurring on the first transmission line, and
wherein the second RFIC includes a second compensation unit comprising circuitry configured to compensate for a loss of the IF signal on the second transmission line, and
wherein the first compensation unit is connected to the IFIC by the first transmission line, and
wherein the second compensation unit is connected to the first compensation unit by the first transmission line.

11. The electronic device of claim 10, wherein the IFIC is configured to transmit and/or receive a first IF signal and a second IF signal with the first RFIC using the first transmission line, and
wherein the first RFIC is configured to transmit and/or receive a second IF signal with the second RFIC using the second transmission line.

12. The electronic device of claim 11, wherein the CP is connected to the first RFIC and the second RFIC using a first control signal line and a second control signal line, respectively, and
wherein the CP is configured to provide the first RFIC and the second RFIC with information necessary to compensate for a loss of each of the first IF signal and the second IF signal.

13. The electronic device of claim 10, wherein the IFIC, the first RFIC, and the second RFIC are mounted on a printed circuit board (PCB), and wherein the IFIC and the first RFIC, and the first RFIC and the second RFIC are connected by wires on the PCB.

14. The electronic device of claim 10, wherein the IFIC is mounted on a PCB,
wherein the first RFIC is positioned adjacent to the PCB,
wherein the second RFIC is positioned farther from the PCB than the first RFIC,
wherein the first RFIC is connected to the IFIC using an IFIC-RFIC transmission line, and
wherein the second RFIC is connected to the first RFIC using an RFIC-RFIC transmission line.

15. The electronic device of claim 10, further comprising:
a connector configured to be connected to an external device, the external device including an accessory capable of being used in connection to the electronic device,
wherein at least one RFIC among the first RFIC and the second RFIC is connected to an RFIC provided in the external device using an RFIC-RFIC transmission line.

* * * * *